US008689850B2

(12) United States Patent
Hull

(10) Patent No.: US 8,689,850 B2
(45) Date of Patent: *Apr. 8, 2014

(54) PEDESTAL MOUNTED ULTRASONIC WELDING DEVICE

(71) Applicant: Gordon Hull, Newtown, CT (US)

(72) Inventor: Gordon Hull, Newtown, CT (US)

(73) Assignee: Rinco Ultrasonics, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 13/751,363

(22) Filed: Jan. 28, 2013

(65) Prior Publication Data
US 2013/0240153 A1   Sep. 19, 2013

Related U.S. Application Data

(63) Continuation-in-part of application No. 13/713,237, filed on Dec. 13, 2012, now Pat. No. 8,591,679, and a continuation-in-part of application No. 12/925,652, filed on Oct. 26, 2010, now Pat. No. 8,376,016.

(60) Provisional application No. 61/569,916, filed on Dec. 13, 2011.

(51) Int. Cl.
B32B 37/00 (2006.01)

(52) U.S. Cl.
USPC ..................... 156/580.2; 156/580.1

(58) Field of Classification Search
USPC ........... 156/73.1, 580.1, 580.2; 264/442, 443, 264/444, 445; 425/174.2; 310/323.01, 310/323.18; 53/451, 479
See application file for complete search history.

(56) References Cited

U.S. PATENT DOCUMENTS

| 2,844,126 A | 7/1958 | Gaylord |
| 2,899,875 A | 8/1959 | Leasure |
| 2,946,119 A | 7/1960 | Jones et al. |
| 3,224,915 A | 12/1965 | Balamuth et al. |
| 3,948,705 A | 4/1976 | Ausnit |
| 4,029,538 A | 6/1977 | Vance, Jr. |
| 4,117,647 A | 10/1978 | Rossi |
| 4,161,420 A | 7/1979 | Clarke et al. |
| 4,288,965 A | 9/1981 | James |
| 4,373,982 A | 2/1983 | Kreager et al. |
| 4,517,790 A | 5/1985 | Kreager |
| 4,532,753 A * | 8/1985 | Kovacs ........................... 53/451 |
| 4,534,818 A | 8/1985 | Kreager et al. |

(Continued)

FOREIGN PATENT DOCUMENTS

JP   H 08-24314 A   1/1996

*Primary Examiner* — James Sells

(74) *Attorney, Agent, or Firm* — Thomas A. O'Rourke; Bodner & O'Rourke, LLP

(57) ABSTRACT

The sonotrode and anvil of co-pending application Ser. No. 12/925,652, for advanced ultrasonic welding of work pieces, are readily incorporated into new form-fill-seal machines, but existing machines with heat-seal stations pose difficult problems for swapping of the sealing packages. Kits enabling heat station replacement, with the further improved sonotrode and anvil disclosed herein, comprise: a housing; a linear rail fixed thereto; anvil and sonotrode support members; and a parallel gripper. Each of the anvil and sonotrode support members is slidably attached to the rail(s) and are also connected to a respective piston of the gripper, permitting actuation of each through cycling of the gripper pistons. The improved sonotrode/anvil combination each comprise a corresponding plurality of energy directors arranged into a three-dimensional grid pattern to produce a narrower weld region, but one exhibiting greater durability, thereby permitting use of less packaging material, and which may also weld a company logo into the workpieces.

31 Claims, 38 Drawing Sheets

(56) References Cited

U.S. PATENT DOCUMENTS

| | | | |
|---|---|---|---|
| 4,537,016 A | 8/1985 | Shanklin et al. | |
| 4,666,536 A | 5/1987 | Van Erden et al. | |
| 4,807,420 A | 2/1989 | Barker | |
| 4,819,411 A | 4/1989 | Konzal et al. | |
| 5,244,532 A | 9/1993 | Wadium et al. | |
| 5,547,284 A | 8/1996 | Imer | |
| 5,605,026 A | 2/1997 | Schott et al. | |
| 5,678,390 A | 10/1997 | Pruett et al. | |
| 5,826,403 A | 10/1998 | Haley | |
| 5,843,540 A | 12/1998 | Heydarpour et al. | |
| 6,029,428 A | 2/2000 | Terminella et al. | |
| 6,066,216 A | 5/2000 | Ruppel, Jr. | |
| 6,135,339 A | 10/2000 | Parrini | |
| 6,178,722 B1 * | 1/2001 | McMahon | 53/412 |
| 6,199,848 B1 | 3/2001 | Bellandi et al. | |
| 6,212,859 B1 | 4/2001 | Bielik | |
| 6,379,483 B1 | 4/2002 | Eriksson | |
| 6,554,931 B1 | 4/2003 | Blanchard et al. | |
| 6,554,957 B2 | 4/2003 | Urlaub | |
| 6,562,166 B2 | 5/2003 | Molander et al. | |
| 6,574,944 B2 | 6/2003 | Capodieci | |
| 6,691,491 B2 | 2/2004 | Terminella et al. | |
| 6,748,723 B2 | 6/2004 | Wadium et al. | |
| 6,780,263 B2 | 8/2004 | Delisle | |
| 6,790,312 B2 | 9/2004 | Cosaro et al. | |
| 6,835,257 B2 | 12/2004 | Perrine | |
| 6,928,794 B2 | 8/2005 | Hamer et al. | |
| 6,986,232 B1 | 1/2006 | Kume et al. | |
| 7,018,493 B2 | 3/2006 | Altmeyer et al. | |
| 7,082,737 B2 | 8/2006 | Van Rens et al. | |
| 7,275,354 B2 | 10/2007 | Frievalt et al. | |
| 7,322,169 B2 | 1/2008 | Kettner et al. | |
| 7,571,810 B2 | 8/2009 | Tilton | |
| 7,584,670 B2 | 9/2009 | Myers | |
| 7,681,378 B2 | 3/2010 | Brormann et al. | |
| 7,722,254 B2 | 5/2010 | Murray | |
| 7,734,276 B2 | 6/2010 | Harrington | |
| 7,793,815 B2 | 9/2010 | Shimizu et al. | |
| 8,376,016 B2 * | 2/2013 | Hull | 156/580.2 |
| 2008/0000202 A1 | 1/2008 | Kettner et al. | |

* cited by examiner

PEDESTAL MOUNTED ULTRASONIC WELDING DEVICE

CROSS REFERENCES TO RELATED APPLICATIONS

This application is a continuation-in-part of U.S. application Ser. No. 13/713,237, titled, "Retrofit of a Form-Fill-Seal Machine Heat Station with an Advanced Ultrasonic Welding Kit," which claims priority on U.S. Provisional Application Ser. No. 61/569,916, filed on Dec. 13, 2011 and which is a continuation-in-part of U.S. patent application Ser. No. 12/925,652, filed Nov. 26, 2010, titled "Sonotrode and Anvil Energy Director Grids for Narrow/Complex Ultrasonic Welds of Improved Durability," now issued as U.S. Pat. No. 8,376,016, with the disclosures of each being incorporated herein by reference.

FIELD OF THE INVENTION

The present invention relates to improvements in form-fill-seal machines, and more particularly to apparatus which are capable of being retrofit onto such machines to improve the machine's productivity through replacement of old-technology heat-sealing elements using a kit comprising an advanced ultrasonic welding stack and anvil.

BACKGROUND OF THE INVENTION

The packaging of food and other products with a sheet of flexible plastic film through an automated process using a machine is typically achieved by butting and sealing the plastic film to form a pouch. There are numerous examples of such machines, which are referred to within the industry as form-fill-seal machines ("FFS machines"), and which may be further subdivided into categories as being either horizontal, vertical, or rotary form-fill-seal machines. An example of a horizontal form-fill-seal machine is shown by U.S. Pat. No. 5,826,403 to Haley; an example of a vertical form-fill-seal machine is shown by U.S. Pat. No. 4,117,647 to Rossi; while an example of a rotary form-fill-seal machine is shown by U.S. Pat. No. 6,212,859 to Bielik.

For a substantial period of time, these form-fill-seal machines utilized heat elements, such as the "heated fin wheels" of the Haley device, to seal the package bottom and its side seam to create a pouch, and after filling that pouch with product, a final heat element would seal the top open end of the pouch to form the package. An early marriage of ultrasonic welding principles for sealing of plastic films with a packaging machine is shown by the 1981 U.S. Pat. No. 4,288,965 to James, for a "Form-Fill-Seal Packaging Method and Apparatus." Ultrasonic welding has since become the preferred method of sealing, because, among other reasons, ultrasonic weld times are less than one second in duration, the process lacks the potential for damage to the packaging material or product from an excessive application of heat, for which traditional heating elements are susceptible, and because the ultrasonic welding process is much better suited to seal through contaminants and product, which the heat sealing process accomplishes poorly, if at all.

Our above-noted co-pending U.S. patent application Ser. No. 12/925,652 for "Sonotrode and Anvil Energy Director Grids for Narrow/Complex Ultrasonic Welds of Improved Durability," furthers this divide. The technology disclosed therein makes even more advantageous the use of ultrasonic welding over heating elements, as it reduces the necessary material, by allowing for a narrower weld, while also simultaneously producing welds of improved durability, which is highly desirable particularly for the packaging of liquid, semi-liquid, and even for the packaging of solids or semi solid products. Of course, the process could still be used to produce wider welds, where they may be desired, for example for aesthetic purposes, rather than for being needed to produce a stronger, more durable seal.

However, while that patent-pending technology may easily be incorporated into newly designed form-fill-seal packaging machines, consumers who either recently or long ago purchased machines that seal through the direct application of heat have been at an impasse. The owner's of those machines do not wish or simply cannot afford the expense of a new array of packaging machines, nor can they afford to not produce packaging with the durability that their competitors will soon be utilizing through the use of machines incorporating this new apparatus. The problem has one added dimension of complexity.

The different types of packaging machines may dictate forming the pouch in different stages and at different locations within the machine. In addition, it is common to have at least one or even multiple heat seal stations just for the final top end sealing of multiple product-filled pouches. Therefore, it is highly desirable to incorporate our patent-pending ultrasonic welding technology onto existing machines, but attempts to accomplish such a retro-fit by package machine operators has been unsuccessful, because of the space-constrained volume allocated to the replacement unit. The current invention discloses an adaptable retrofit kit and method for successfully accomplishing retrofitting of the heat station for different kinds of form-fill-seal machines.

OBJECTS OF THE INVENTION

It is an object of the invention to provide a means of retrofitting the heat station of a form-fill-seal machine with advanced ultrasonic welding equipment.

It is another object of the invention to provide a means of retrofitting a space-constrained volume of a form-fill-seal or pre-made pouch type machine with a kit comprising advanced ultrasonic welding equipment.

It is a further object of the invention to provide a versatile retrofit kit for replacing a heat station with a kit comprising advanced ultrasonic welding, for either a horizontal or a rotary type of form-fill-seal or pre-made pouch type machine.

It is another object of the invention to provide a retrofit kit for advanced ultrasonic weld sealing of two or more product pouches simultaneously.

Further objects and advantages of the invention will become apparent from the following description and claims, and from the accompanying drawings.

SUMMARY OF THE INVENTION

Advanced ultrasonic welding components of our co-pending application Ser. No. 12/925,652 are readily incorporated into the design of new form-fill-seal machines, but the owners of older machines, which utilize heat-seal stations, were unsuccessful at devising suitable apparatus and methods for retrofit of the sealing equipment. A retrofit that adeptly replaces the older heat sealing station of either horizontal or rotary form-fill-seal machines, with an advanced ultrasonic sonotrode and anvil of our co-pending application, may comprise the following kit: a housing; a linear rail fixed to the housing; at least first and second bearing carriages being slidable upon the rail; and first and second fluidic muscles. Each of the fluidic muscles may be mounted with a first end being fixed to a respective housing wall, and a second end being fixed to a respective bearing carriage. Attachment to the respective bearing carriage may be through attachment of each muscle to a respective mounting member that may be fixed to respective mounting blocks, which are then fixed to the bearing carriages. The advanced anvil and sonotrode may be secured to respective carriages.

Actuation of each carriage may be through the pressurization of the fluidic muscles, which in turn causes cyclic expansion of the chamber of each muscle, which is accompanied by linear contraction along its length. The contraction of each fluidic muscle causes simultaneous converging translation of the first and second mounting members relative to the linear rail, to cause engagement of a surface of the anvil with a surface of the sonotrode. Synchronizing the electrical power for the stack to correspond to this period of engagement, permits sealing of pouches, which move along a conveyor or a rotary dial, while they are positioned between the anvil and sonotrode. Depressurization of the fluidic muscles causes reverse translation and disengagement of the anvil from the sonotrode, after which the conveyor or rotary dial may advance to cause exiting of the sealed pouch, and positioning of another unsealed pouch between the anvil/sonotrode combination.

Specially configured in-line arrangements of the anvil/sonotrode, the bearing carriages, the first fluidic muscle, and the second fluidic muscle, serve to provide a very narrow profile, which permits side-by-side kit installations for a retrofit that accomplishes duplex, triplex, or more sealing of pouches on a horizontal machine.

BRIEF DESCRIPTION OF THE DRAWINGS

FIG. 22A is a perspective view showing the leveling feet after being threadably received in the mounting base plate, and the anvil just prior to being received over the mounting feet.

FIG. 22B is the perspective view of FIG. 22A after the anvil has been received over the leveling feet, and with the holding screws being threadably received in the leveling feet to releasably secure the anvil to the mounting base plate.

FIG. 22C is the perspective view of FIG. 22B, with the user preparing to loosen one of the holding screws to make an adjustment to the corresponding leveling foot.

FIG. 22D is the perspective view of FIG. 22C, after the user has loosened the holding screw by one-quarter of a turn.

FIG. 22E is the perspective view of FIG. 22D, with the user preparing to rotate the leveling foot to locally adjust the height of the anvil thereat.

FIG. 22F is the perspective view of FIG. 22E, after the user has rotated the leveling foot to locally adjust the height of the anvil thereat.

DETAILED DESCRIPTION OF THE INVENTION

Initial attempts by package machine operators to retrofit existing form-fill-seal machines with the ultrasonic welding technology of our co-pending application Ser. No. 12/925,652, were unsuccessful. The volume that could be occupied by the retrofit apparatus was extremely constrained. This constraint was exacerbated by the scenario where a duplex or triplex sealing operation was required at the heat station. A single large horn and anvil being moved to engage each other using conventional actuators were too slow to achieve satisfactory results or outside the realm of single width ultrasonic horn technology. Using two different pairs of horn/anvil combinations was unsatisfactory because of the difficulty in calibrating synchronous engagement of the pairs while the forces generated were too small, and resort to a servo-motor was considered for synchronization, but found to be overly expensive for the application, as it would diminish its marketability.

Figure 1:
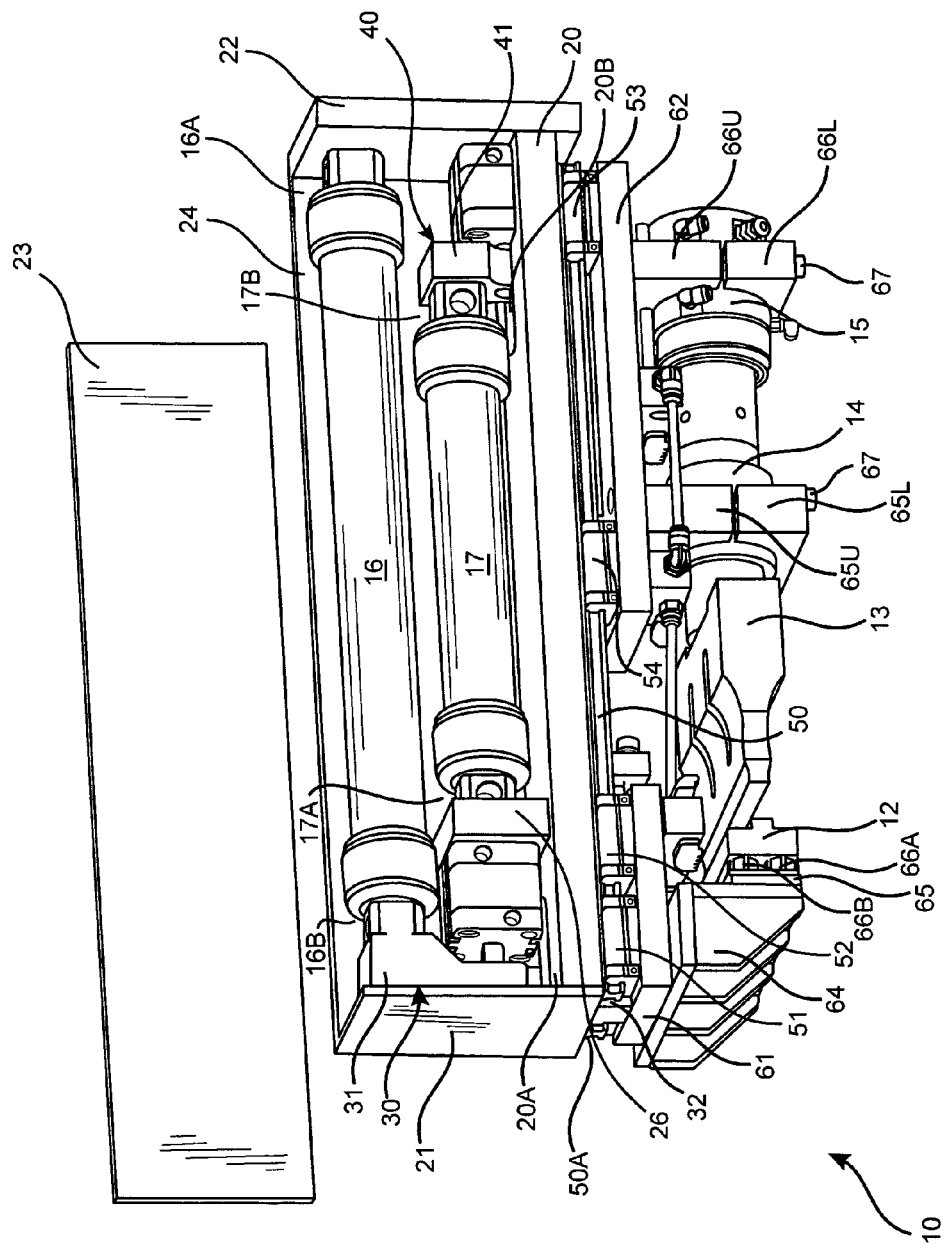
FIG. 1 is a perspective view of a first embodiment of the main components of an advanced ultrasonic welding retrofit kit of the current invention, with a housing side panel removed to expose the fluid mechanical muscles therein.

FIG. 1 shows a perspective view of a first embodiment of the retrofit kit 10 of the present invention, which elegantly overcame these obstacles, being shown with a housing side panel 23 removed to expose the actuation portion of the invention.

The device utilizes a pair of fluidic mechanical muscles in a specially created dual linear mechanism for simultaneous actuation of both the anvil and the horn/booster/converter stack. Today's "Fluidic Muscle," as it is commonly termed (along with pneumatic artificial muscle), is in part the progeny of an invention by Richard Gaylord. Gaylord, in 1955, received U.S. Pat. No. 2,844,126 for a "Fluid Actuated Motor System and Stroking Device." In general, a fluidic muscle may be constructed by wrapping a synthetic or natural rubber tube with a woven sheath. This forms an expansible chamber. When a pressurized fluid is applied to the chamber of the fluidic muscle, the chamber expands radially and is accompanied by a corresponding contraction in its length, resulting in linear motion. Metallic or plastic fittings may be secured at both ends to transmit the resultant motion.

The retraction strength of the muscle may be determined by the total strength of the individual fibers forming the woven sheath, while its exertion distance may be determined according to the tightness of the weave, where a looser weave may allow greater bulging, resulting in further twisting of the individual fibers in the weave. Fluidic muscles for use with the current invention may be obtained from the Festo Corporation, located in Mt. Prospect, Ill. (see www.festo.com).

Fluidic muscles are commonly utilized in pairs—one agonist and one antagonist, where the antagonist acts in opposition to the motion of the agonist, thereby mimicking the functioning of muscles within the human body (e.g., an extensor muscle that opens a joint and a flexor muscle to act in opposition to close the joint). However, in this invention, the fluidic muscles operate in a different mode.

In the simplest possible embodiment, a single fluidic muscle may be used to replicate the linear motion provided by the press 190 in a typical prior art ultrasonic welding machine 100, represented in FIGS. 13A and 13B. However, in practice, this is not very conducive to the successful retrofitting of many form-fill-seal machines, particularly for a horizontal type machine. In such machines, because the pouch(es) may translate along a conveyor towards a heat station (see e.g., packaging machine 5 in FIG. 1 of U.S. Pat. No. 5,826,403 to Haley), where one or more heating elements may converge upon the pouch(es) to seal it, it is highly desirable to impart motion to both the anvil and the sonotrode. This dual motion may be set so as to have the sonotrode and anvil generally converge at the mid-plane of the opening to thereat apply pressure and vibration energy necessary for localized heating and melting of the plastic film to seal the opening.

Figure 2:
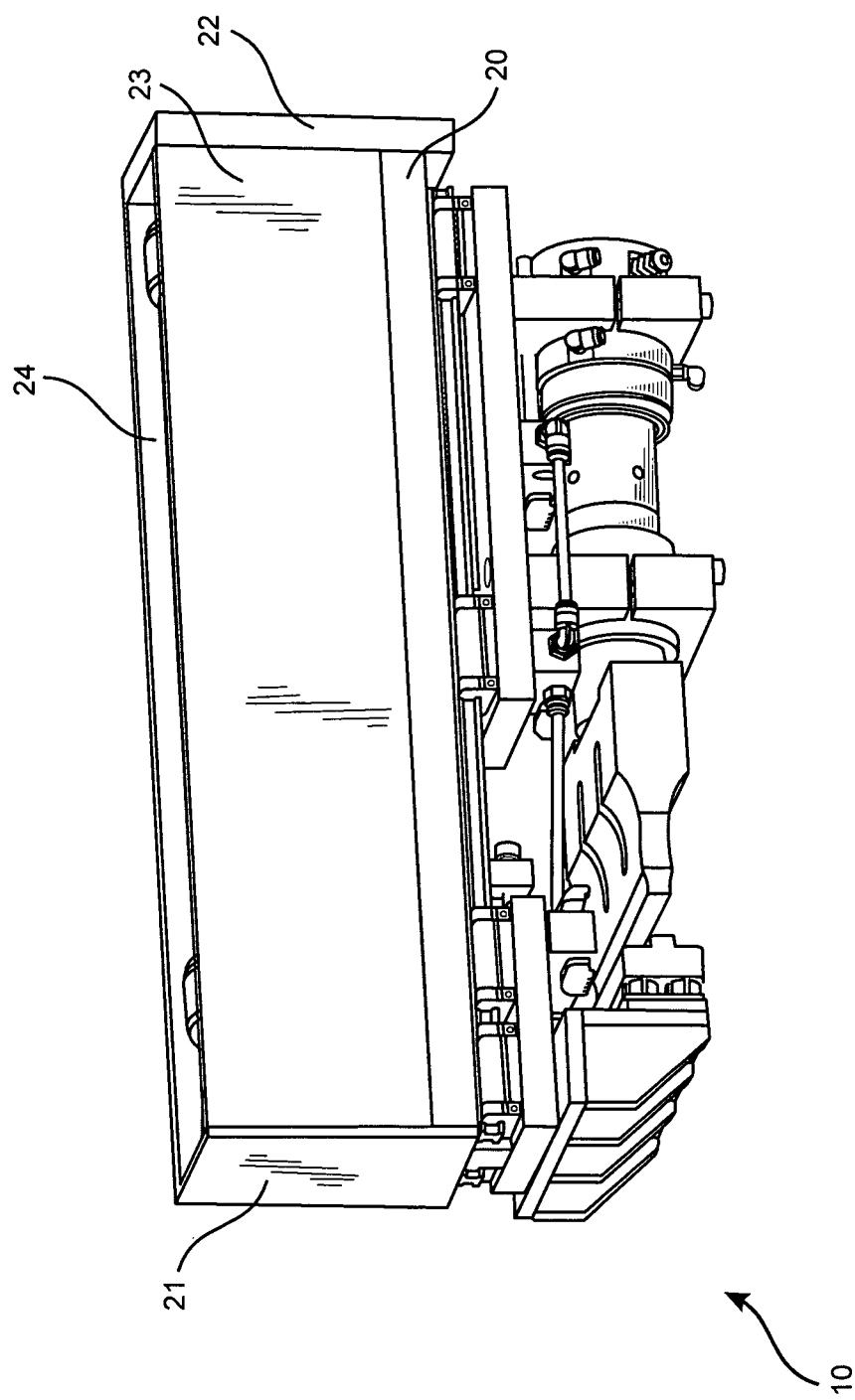
FIG. 2 is a perspective view of the retrofit kit of FIG. 1, with the housing panel shown installed to enclose the fluid mechanical muscles.
Figure 7:
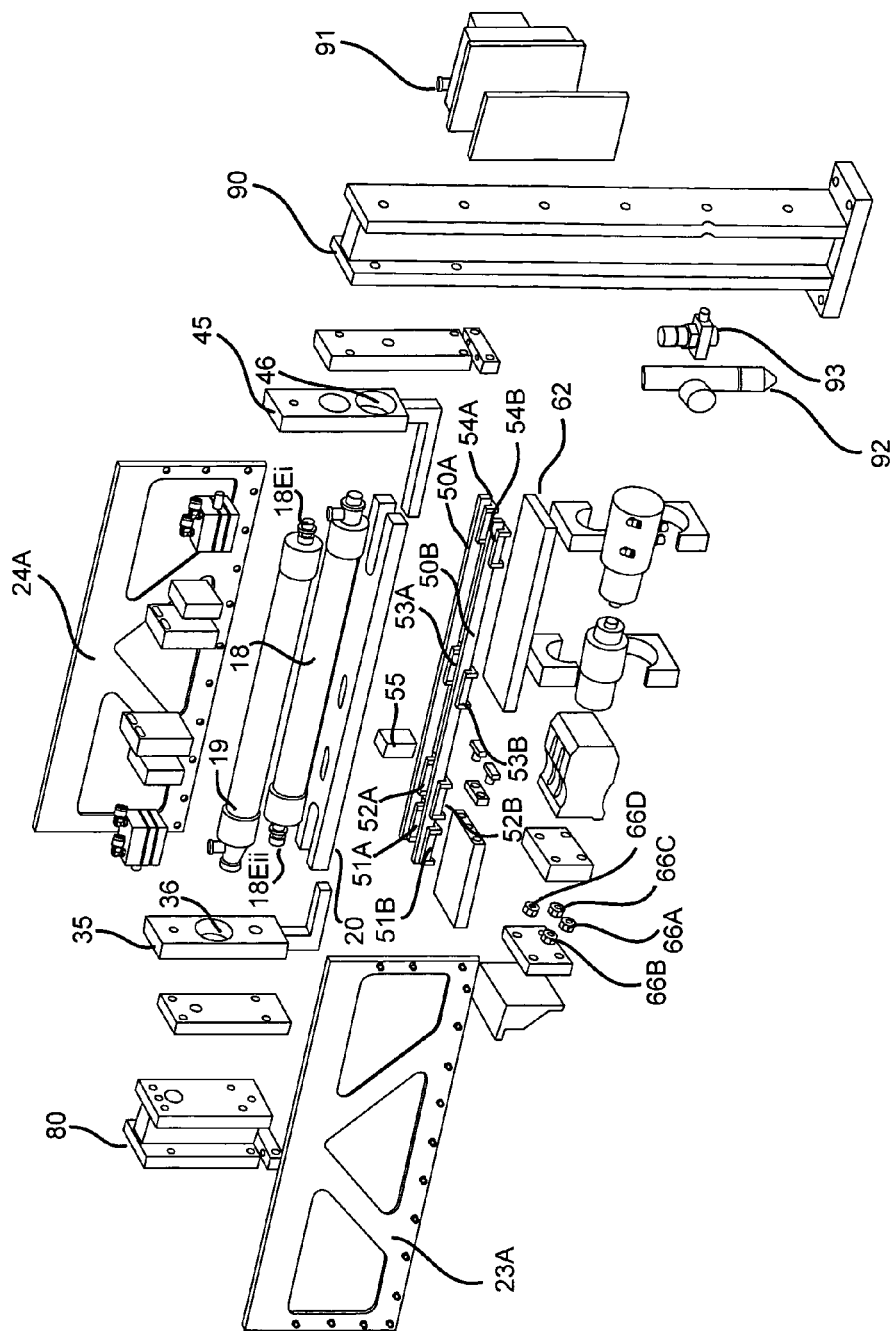
FIG. 7 is an exploded view of the parts comprising the retrofit kit, as seen in FIG. 6.

A first embodiment of the present invention is shown by the retrofit kit 10 in FIG. 1 (with a side panel 23 of the housing removed), and is also shown in FIG. 2. The retrofit kit 10, which may be used in the replacement of one or more heat sealing elements of either a horizontal or a rotary form-fill-seal machine, may include a housing having a base 20, a first end wall 21, a second end wall 22, a first side wall 23, and a second side wall 24. The housing may also comprise a mid-wall 26. Many of these components are common to a later discussed embodiment, for which an exploded view is shown in FIG. 7, so reference thereto may be advantageous. The housing side panels 23 and 24 may be used to enclose and protect the fluidic muscles, along with the base 20 and end walls 21 and 22, and in addition, an optional cover (not shown) may be used for those reasons as well. Also, side panels 23 and 24 may serve to add structural rigidity to the housing; however, the panels 23 and 24 are not required for supporting the functionality of the mechanism, as will be seen hereinafter.

The base 20 may have a first opening 20A and a second opening 20B, both of which may be slotted openings. A first mounting member 30 may have a portion being disposed part-way through the first opening 20A in base 20. In one embodiment, first mounting member 30 may preferably be "L"-shaped, and may have one leg 31 of the "L" protruding up through the opening 20A in base 20, and the other leg 32 may be disposed so as to generally parallel the base 20 of the housing. The first mounting member 30 may therefore be slidable within the slotted opening 20A of the base 20 of the housing. A second mounting member 40 may be similarly constructed with first and second legs 41 and 42, and be correspondingly disposed so as to be slidable within the second opening 20B in the base. The ends of the second legs 32 and 42 of the "L"-shaped mounting members may face each other within the kit assembly.

The second legs 32 and 42 of the "L"-shaped mounting members 30 and 40 may each be attached to at least one respective bearing carriage, which may be slidable upon a linear rail. In a preferred embodiment, a linear rail with four bearing carriages being slidable thereon may be used. Linear rails and bearing carriages are commercially available, and may be obtained from PBC Linear, in Roscoe, Ill. (see www.pbclinear.com/Pages/Linear-Components, the disclosures of which are incorporated herein by reference). A linear rail 50 may be secured to the bottom of base 20, and may have bearing carriages 51, 52, 53, and 54 being slidable thereon, as seen in FIG. 1. Depending upon the linear rail selected, and the method utilized for attachment to the housing base 20, it is possible for the second leg 32 of the "L"-shaped mounting member 30 to attach directly to the bearing carriages 51 and 52, with the second leg 42 of the "L"-shaped mounting member 40 attaching directly to the bearing carriages 53 and 54.

Figure 8:
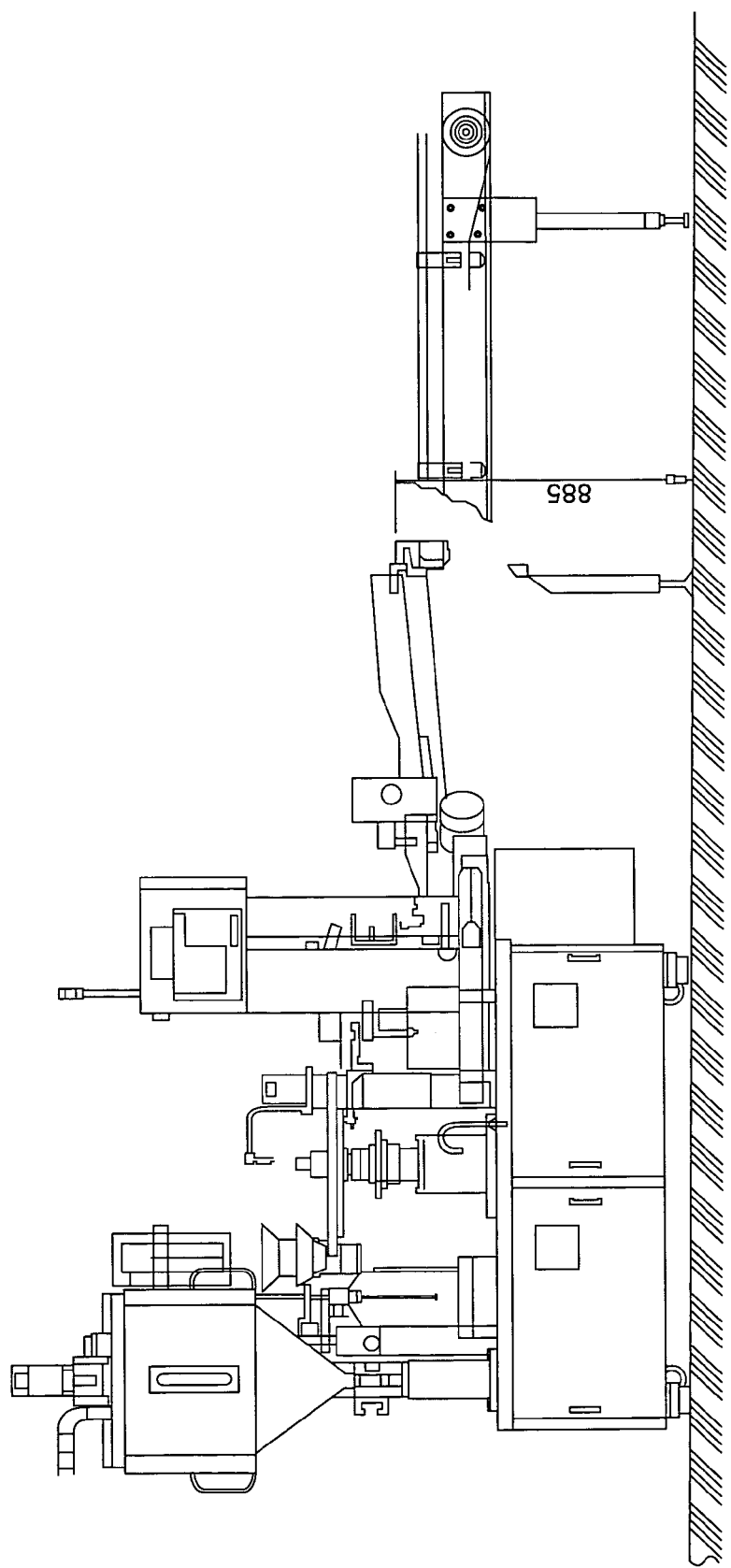
FIG. 8 is a front view of a rotary form-fill-seal machine capable of being retrofitted with the advanced ultrasonic welding retrofit kit of FIG. 6.

Alternatively, and as may be seen in FIG. 8, a split linear rail 50A and 50B may be used, with pairs of bearing carriages 51A, SIB, 52A, 52B, 53A, 53B, 54A, and 54B being slidable upon the rail pair 50A/50B, and with carriages 51A, 51B, 52A, and 52B being secured to a mounting block 61, and with carriages 53A, 53B, 54A, and 54B being secured to a mounting block 62. As seen in FIG. 1, the opening formed between the split rails 50A/50B and bearing carriage pairs may serve to permit attachment of the second leg 32 of the first "L"-shaped member 30 to mounting block 61, and permit attachment of the second leg 42 of the second "L"-shaped member 40 to mounting block 62. (Note—attachment of any of the housing components or other parts described herein may be accomplished using a suitable adhesive or any mechanical fasteners know in the art to be appropriate for the materials used, which may be wood, metal, or plastic). With the length of the linear split rails 50A/50B selected to span the slotted openings 20A and 20B in base 20, the first mounting member 30 may thereby be slidable with respect to the first end of the housing, being proximate to the housing end wall 21, within slotted opening 20A. The second mounting member 40 may thereby be slidable with respect to the second end of the housing, being proximate to the housing end wall 22, within slotted opening 20B.

An advanced anvil 12, which incorporates the features disclosed in co-pending application Ser. No. 12/925,652, may be secured to the mounting block 61. In a preferred embodiment, an angled gusset assembly 64 may first be secured to the mounting block 61, and then the anvil 12 may be secured to the gusset assembly 64. To accommodate the build-up of tolerances and to generally permit adjustments to the precise static positioning of the anvil, the importance of which is discussed hereinafter, a base plate 65 may be located between the gusset assembly 64 and the anvil 12, and leveling feet may be positioned between the base plate 65 and the anvil 12.

An advanced sonotrode 13, which incorporates features disclosed in co-pending application Ser. No. 12/925,652, may form part of a stack that also includes a booster 14 and a converter 15. The stack may be secured to the mounting block 62 using upper and lower clamp blocks 65U/65L that secure the booster, and upper and lower clamp blocks 66U/66L that secure the converter. The upper clamp blocks 65U and 66U may each be fixedly secured to the mounting block 62, and the lower clamp blocks 65L and 66L may each be releasably secured to the corresponding upper clamp blocks using set screws 67, to releasably secure the stack to the mounting block 62.

Figure 3:
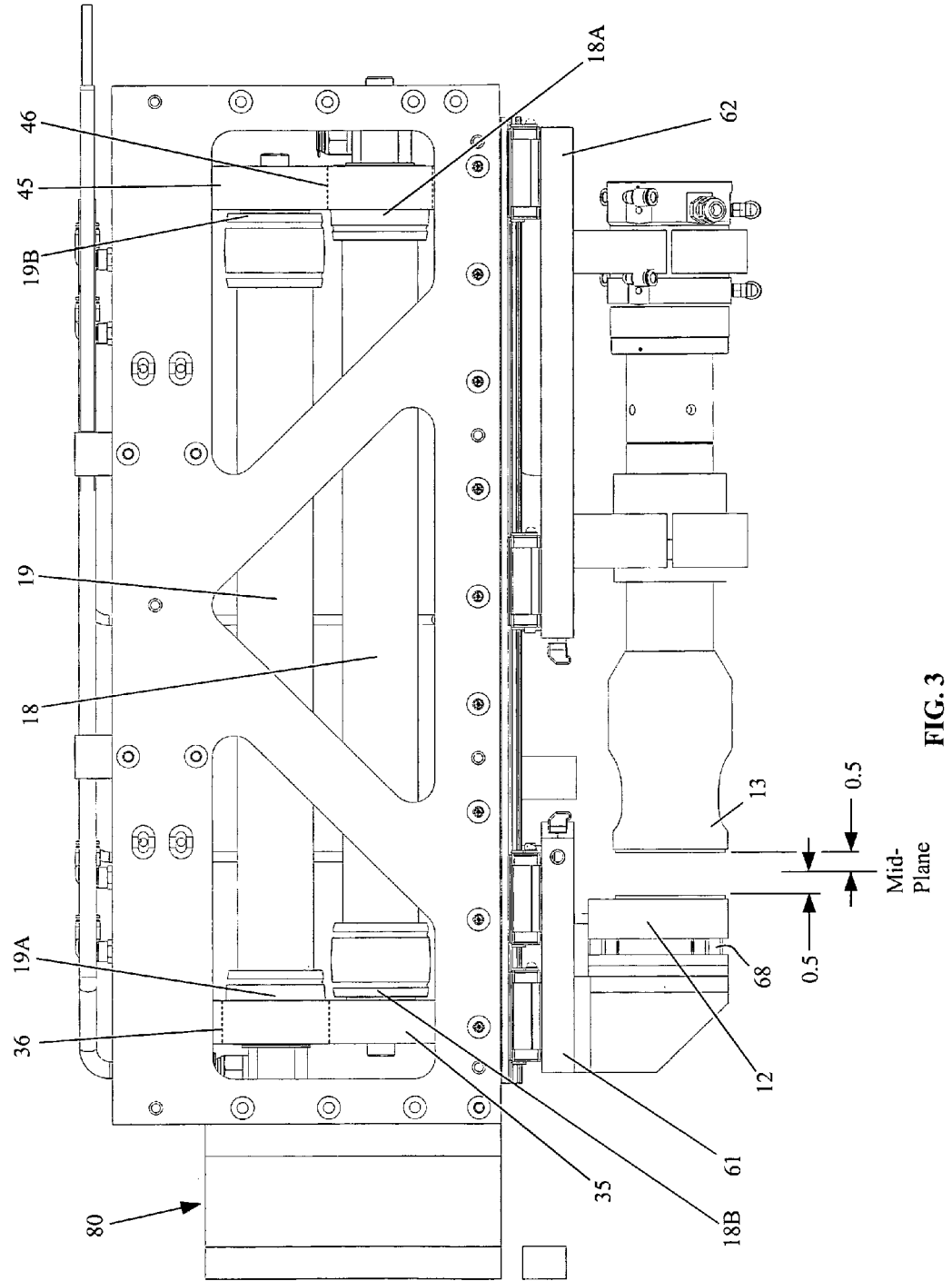
FIG. 3 is an enlarged side view of a second embodiment of the retrofit kit of the current invention.
Figure 11:
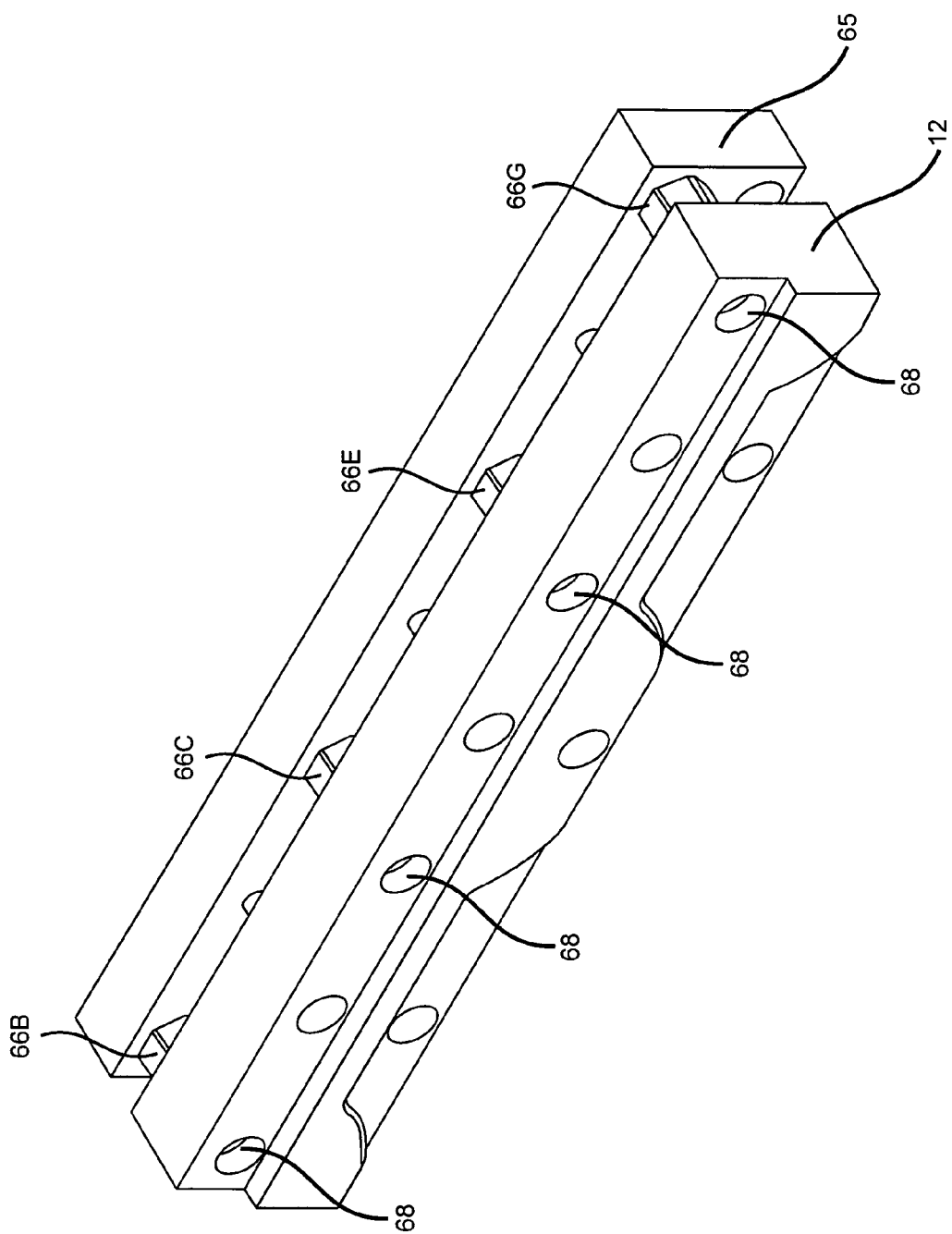
FIG. 11 is a detail view of an anvil that is usable with the present invention, along with leveling feet and a mounting base that is securable to the housing herein.
Figure 12:
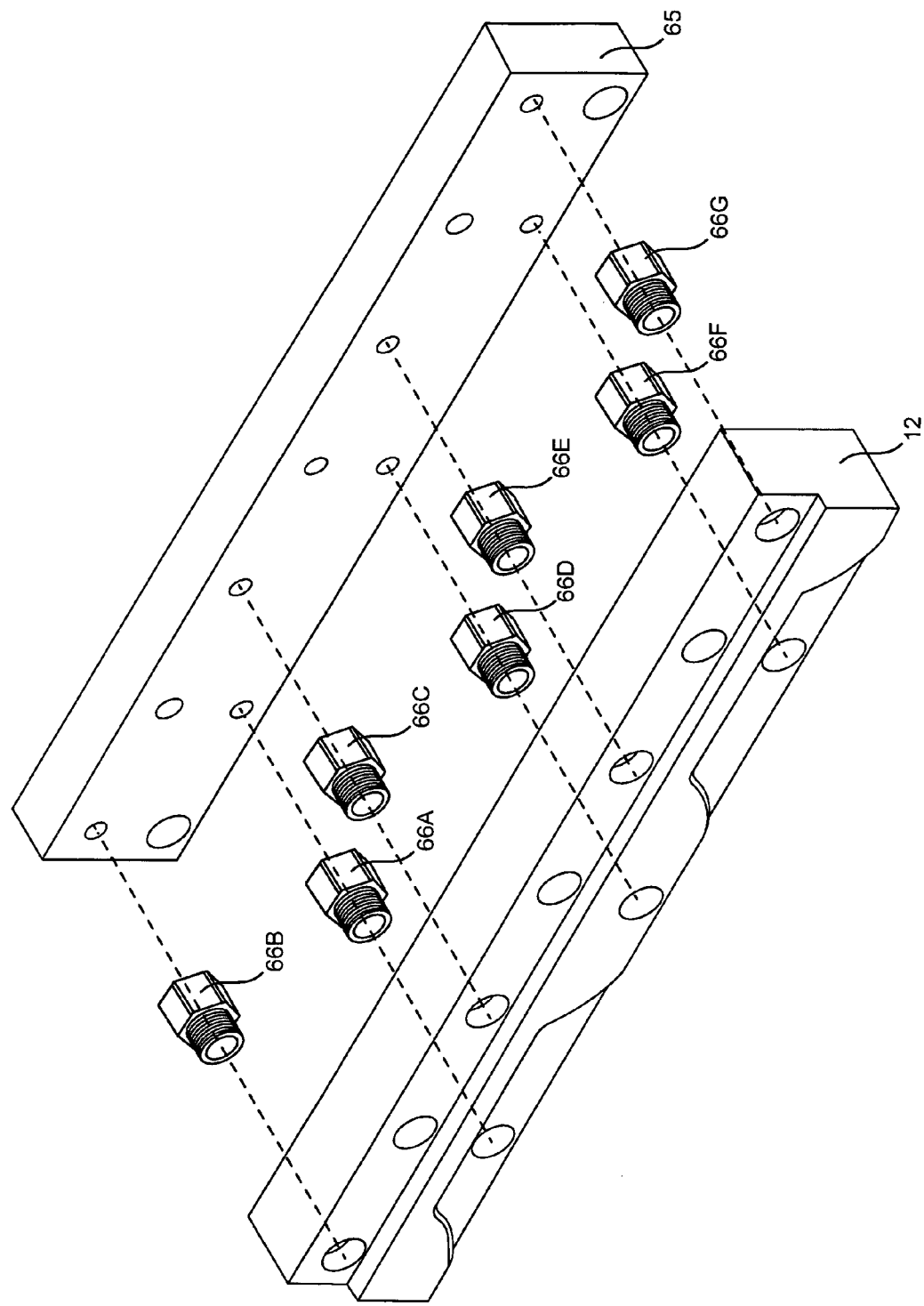
FIG. 12 is an exploded view of the anvil, leveling feet, and mounting base of FIG. 11.

One embodiment of the leveling feet, base, and anvil is shown in an exploded view in FIG. 12. In the embodiment of FIG. 12, leveling feet 66A, 66B, 66C, 66D, 66E, 66F, and 66G are shown prior to being threadably engaged within corresponding threaded holes in the anvil 12, after which the anvil and leveling feet may be secured to the base and to the gusset assembly 64 using screws 68, as seen in FIG. 11 and FIG. 3. The degree to which each of the leveling feet 66A-66G are threadably engaged therein may be adjusted—inward and outward—in order to provide carefully controlled and adequate support across the length of the anvil 13, so that its series of energy director grids, as described in co-pending application Ser. No. 12/925,652, may properly engage the corresponding series of energy director grids of the advanced sonotrode 13. A contact sheet may be utilized between the energy director grids of the sonotrode and the anvil, during their engagement, which is discussed hereinafter, to determine if the engagement is proper, with adjustments to the leveling feet being made to achieve uniform contact therebetween.

With this arrangement of FIG. 1, a first fluidic muscle 16 may have a first end 16A being fixed to the second end wall 22 of the housing, and a second end 16B of fluidic muscle 16 may be fixed to the first leg 31 of "L"-shaped mounting member 30. A second fluidic muscle 17 may have a first end 17A being fixed to the housing mid-wall 26 of the housing, and a second end 17B of fluidic muscle 17 may be fixed to the first leg 41 of "L"-shaped mounting member 40. The fluidic muscles 16 and 17 may preferably be attached as described to also be disposed in-line, relative to the linear rail 50 and to the anvil 12 and the stack with sonotrode 13. This in-line arrangement creates an assembly that possesses a very narrow, though elongated shape, which facilitates installation of the retrofit kit 10 into a space constrained envelope currently occupied by the heat seal station of certain form-fill-seal machines (see generally FIGS. 3 and 4, which illustrate installation of a second retrofit kit embodiment 10A of the present invention onto such a machine).

With the retrofit kit 10 being assembled as described above, and with pneumatic/hydraulic tubes being appropriately installed to port pressure to the fluidic muscles 16 and 17, pressurizing of the first and second fluidic muscles may cause translation of the first muscle mounting member 30 and translation of the second muscle mounting member 40, with the translation being generally simultaneous and being relative to the linear rail, and with it causing convergence of the two mounting member so as to cause engagement of a surface of the anvil 12 with a surface of the sonotrode 13. A controller may be used to sequence porting of pneumatic/hydraulic pressure to the fluidic muscles and corresponding depressurizing, with the pulsing of electric power to the stack to cause the mechanical vibrations that creates friction between the "work piece" materials (the sides of the open end of the pouch) to generate heat to melt the contact area therebetween. Depressurizing of the first and second fluidic muscles 16 and 17 may cause reverse-translation of the first and second muscle mounting members 30 and 40 relative to the linear rail pair 50A/50B to cause disengagement of (or separation between) the engaging surface of the anvil 12 and the engaging surface of said sonotrode 13, after an appropriate weld time has elapsed.

The translation of the two mounting members 30 and 40 need not be simultaneous, but it is important that the engaging surface of the anvil 12 and the engaging surface of the sonotrode 13 meet at a prescribed "mid-plane," where the pouch is positioned. (Note that the respective engaging surfaces of the anvil 12 and sonotrode 13 may not be planar, such as when using the energy director grids of the Applicant's co-pending application Ser. No. 12/925,652, in which case the "mid-plane" may be construed to be found by generally using the plane formed at the most extreme portion of the plateau surfaces therein, or the plateau surface itself when it is formed to be planar). As seen in FIG. 7, a mechanical stop 55 may be used to institute a travel limiting set point so that when the fluidic muscles are activated, the anvil and sonotrode will suitably mesh in the middle. Typically the anvil side reaches the mid-plane first, since there is less mass to move, and it's travel will thereat be limited by contact with the mechanical stop 55. The horn side will soon thereafter come into contact with the anvil in the middle, as set by the adjustable mechanical stop 55. Without the adjustments provided by the mechanical stop 55, any differential in reaching the pouch may otherwise serve to cause deflection of the pouch, resulting in a distorted weld line, and an aesthetically unappealing package. Having two different sized fluidic muscles 16 and 17 may require some additional adjustment to the arrangement to coordinate the arrival times of the anvil 12 and sonotrode 13 at the plane where the pouch is to be sealed. If the first and second fluidic muscles are the same size, certain efficiencies may be obtained.

Figure 3A:
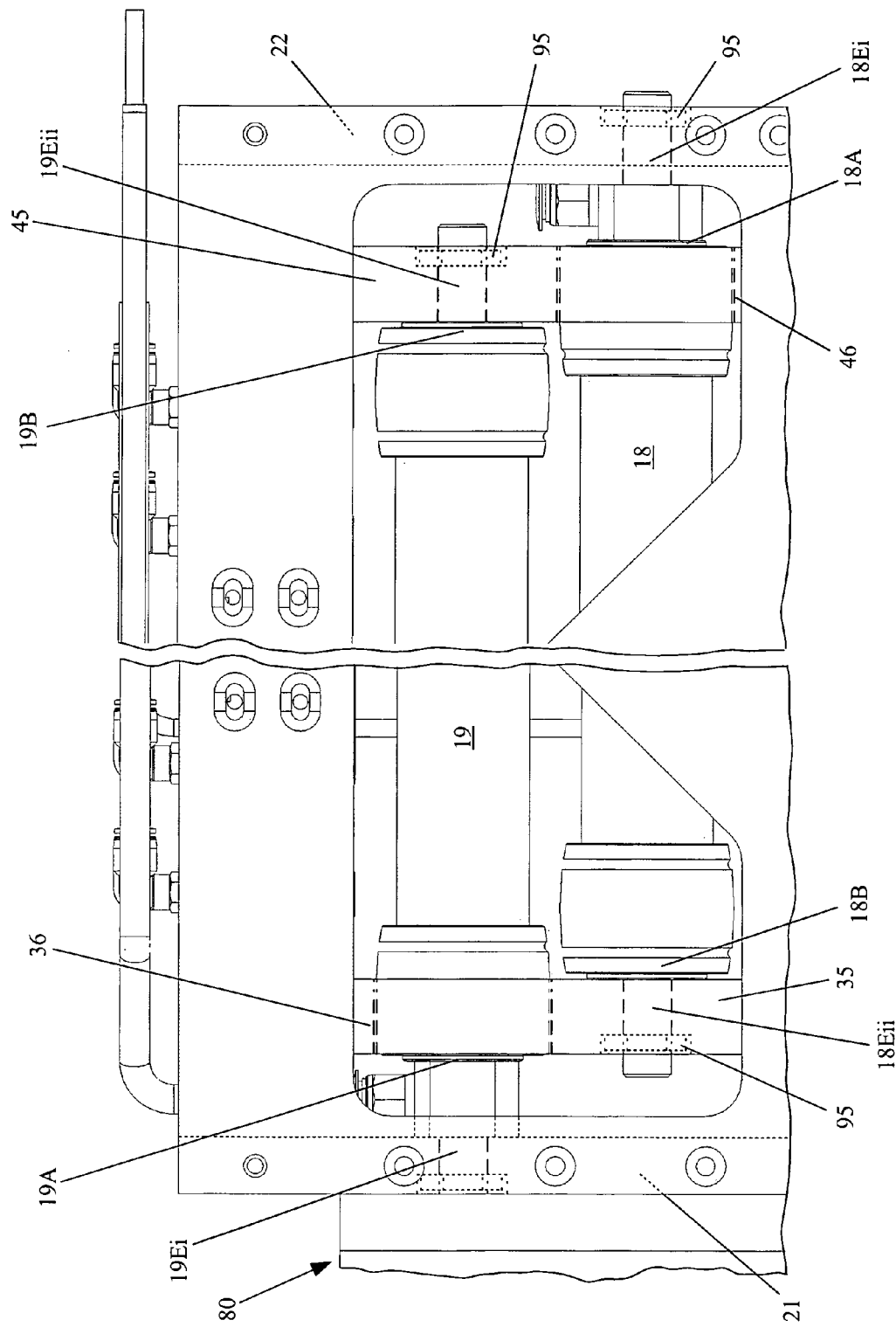
FIG. 3A is a further enlarged view of the retrofit kit of FIG. 3.
Figure 4:
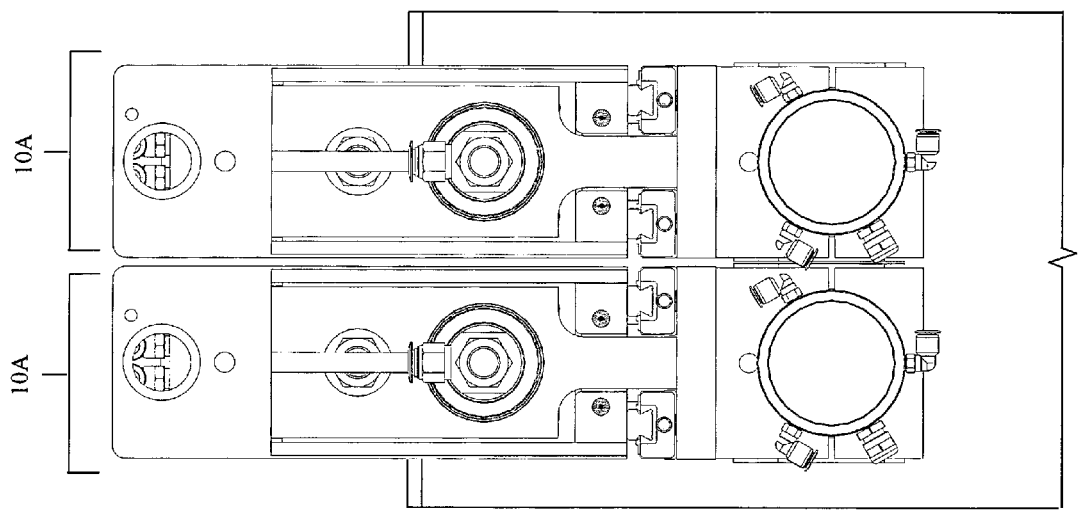
FIG. 4 is an end view of the retrofit kit of FIG. 3.

A second embodiment 10A of the retrofit kit of the current invention is shown mounted to a horizontal form-fill-seal machine in FIGS. 3 and 4. This installation of the kit 10A is shown enlarged in FIG. 3A, and has its component parts shown in the exploded view of FIG. 7. The kit 10A may make use of two identical fluidic muscles 18 and 19, and may therefore be capable of simultaneous and equal translation amounts for both the anvil 12 and sonotrode 13, largely eliminating the need for adjustments due to different travel distances or times. In FIG. 3, it may be seen that the engaging surface of the anvil 12 and the corresponding engaging surface of the sonotrode 13 may each be located, prior to pressurization of the fluidic muscles and the associated translation, approximately 0.5 inches away from the mid-plane at which the pouch to be sealed may ideally be positioned. Utilizing the same fluidic muscle 19 for translation of the sonotrode 13 on the slidably mounted block 62, as the fluidic muscle 18 for translation of the anvil 12 on the slidably mounted block 61, may also result in equal speeds of translation.

Inline positioning of the same fluidic muscles 18/19 may be accomplished, as seen in FIGS. 3A and 7 for this second embodiment, by providing a clearance hole 36 in the first mounting member 35 to permit sliding of the first mounting member relative to the fluidic muscle 19 without any contact occurring therebetween, and by providing a clearance hole 46 in the second mounting member 45 to permit sliding of the second mounting member 45 relative to the fluidic muscle 18 without any contact occurring therebetween. Many other aspects of retrofit kit 10A may otherwise be similarly constructed to retrofit kit 10. The first end 18A of the fluidic muscle 18 may be secured to the housing, albeit by passing through the oversized orifice 46 in the second mounting member 45, and possibly being with the use of an extended end fitting 18Ei on the fluidic muscle, with the fitting having a threaded portion thereon to which a nut 95 may torqued to secure it to the housing end wall 22. The second end 18B of the fluidic muscle 18 may also have an extended end fitting 18Eii with a threaded portion thereon to which a nut 95 may be torqued to secure it to the first mounting member 35. Also, the first end 19A of the second fluidic muscle 19 may be secured to the housing, albeit by passing through an oversized orifice 36 in said first mounting member 35, and possibly being with the use of extended end fitting 19Ei on the fluidic muscle, with the fitting having a threaded portion thereon to which a nut 95 may torqued to secure it to the housing end wall 21. The second end 19B of the fluidic muscle 19 may also have an extended end fitting 19Eii with a threaded portion thereon to which a nut 95 may be torqued to secure it to the first mounting member 45.

Figure 9:
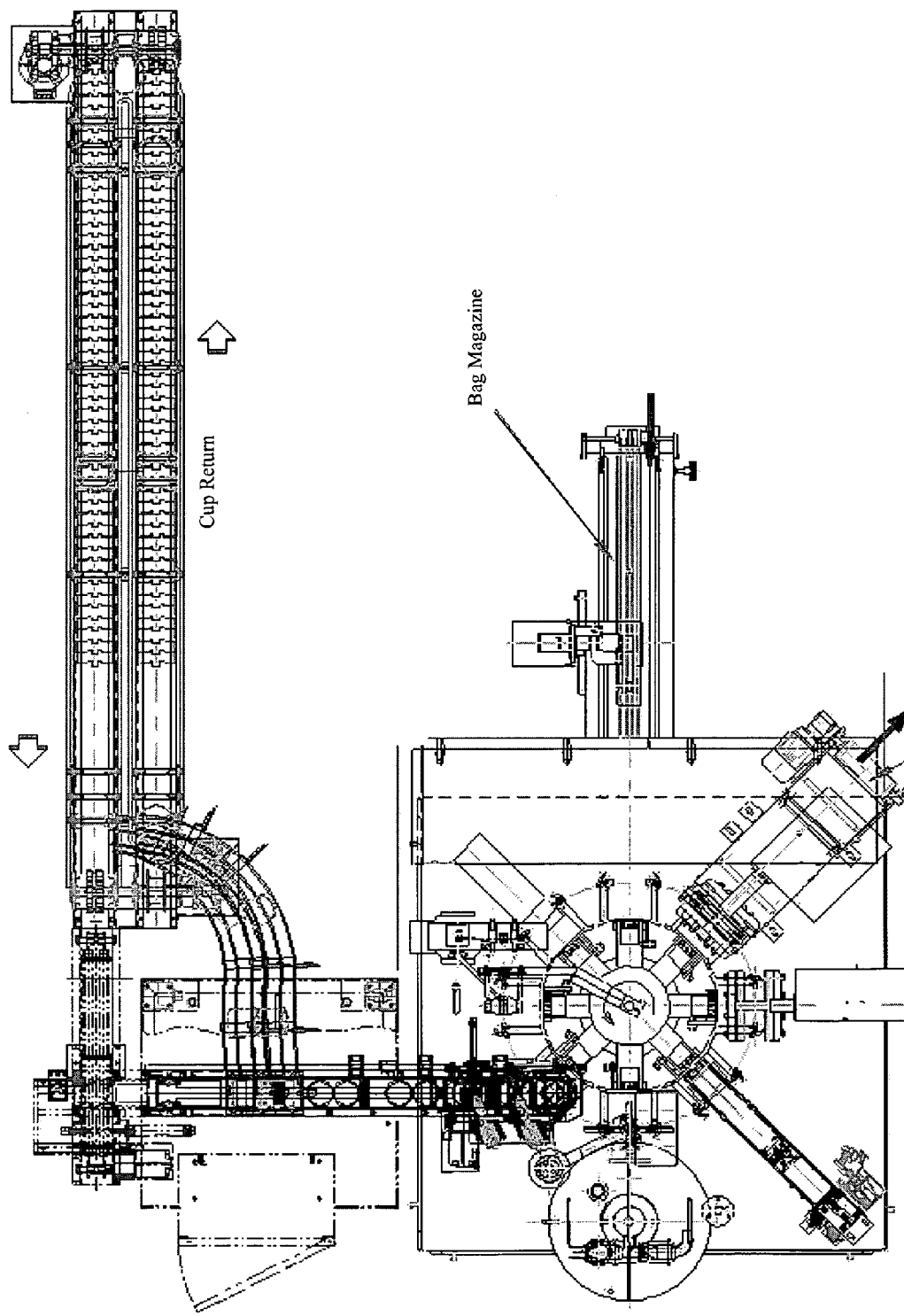
FIG. 9 is a top view of the rotary form-fill-seal machine of FIG. 8.
Figure 10B:
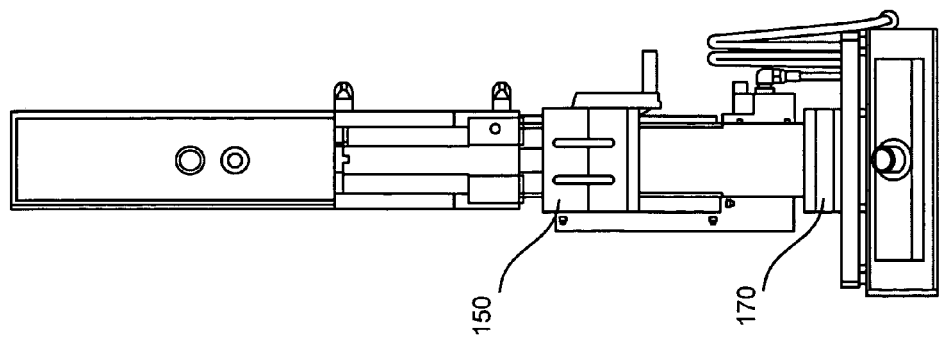
FIG. 10B is a front view of the prior art ultrasonic welding machine of FIG. 10A.
Figure 10A:
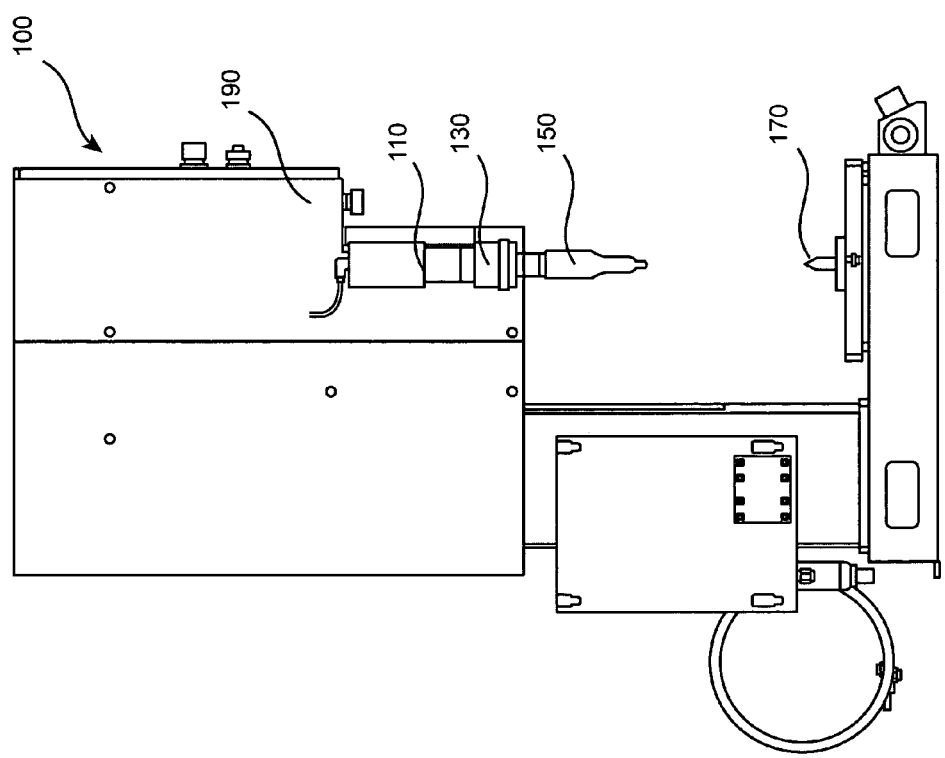
FIG. 10A is a side view of a prior art ultrasonic welding machine.

Retrofit of the advanced technology ultrasonic anvil and sonotrode onto existing form-fill-seal machines may require the removal of one or more heat sealing stations and any associated support brackets originally used to secure the heat station to a frame of the machine. The retrofit kit 10 or kit 10A may be supplied for installation thereon. Because of differences in the frame and other features of certain machines produced by various manufacturers, a horizontal machine spacer assembly 80 (FIGS. 3, 3A, 6, and 7) may be needed to properly position the kit so that the anvil and sonotrode are both properly displaced on opposite sides of the theoretical pouch mid-plane, as the pouches advance along the conveyor. Also, for a rotary form-fill-seal machine, such as the one shown in FIGS. 8 and 9, proper installation of the kit may also require support of the outward radially located end of the kit, through the use of a rotary machine column assembly 90.

Figure 5:
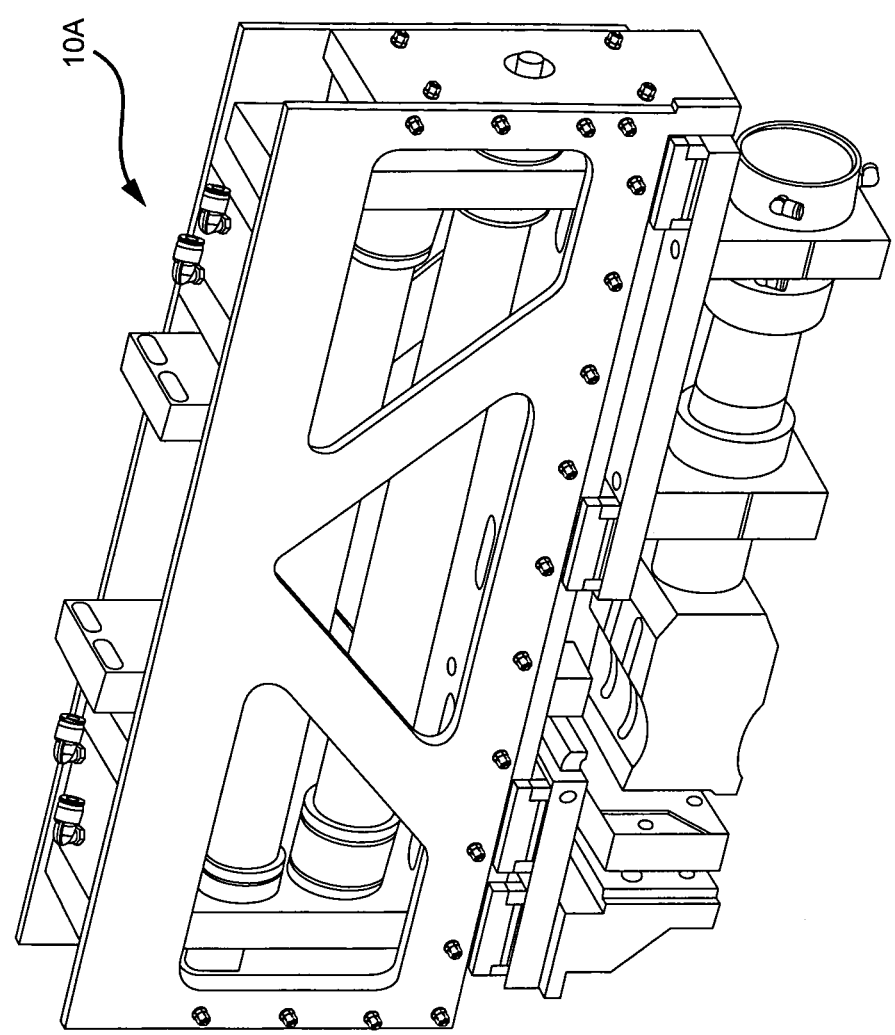
FIG. 5 is a perspective view of the retrofit kit of FIG. 3.
Figure 6:
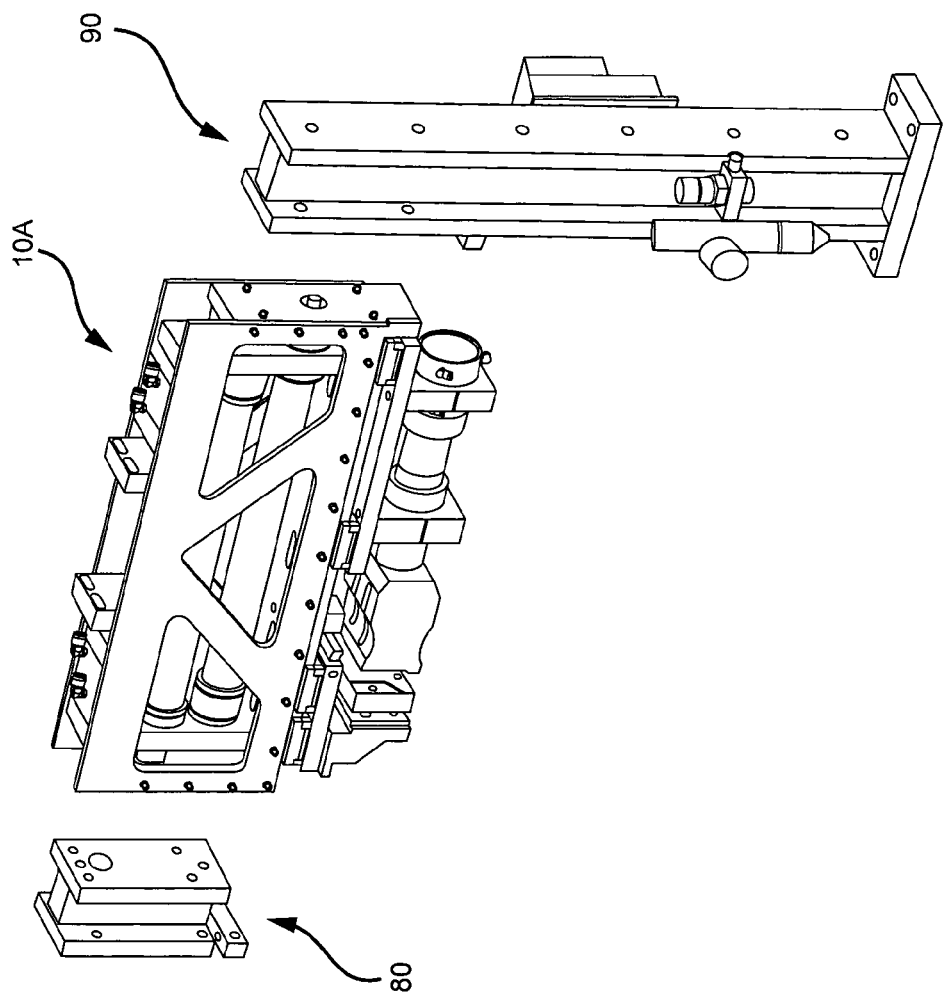
FIG. 6 is the perspective view of the retrofit kit of FIG. 5, being reduced in size and shown with an optional horizontal machine spacer, and with an optional rotary machine column assembly that may be configured with a fixed static height, or an adjustable height in the vertical ("Z") direction.

Each of the kits, as well as the horizontal machine spacer assembly 80 or the rotary machine column assembly 90, may require drilling of mounting holes into the frame of the machine that is to be retrofitted. As seen in FIG. 5, these holes may be located in one of the housing end walls 21122 as pilot holes, which may then be used as a template for drilling common full size holes in both the kit and the machine's frame. Thereafter, the kit may be secured to the frame of either a horizontal or a rotary form-fill-seal machine using any suitable fastening means known to one skilled in the art, including, but not limited to, nuts, lock washers, and bolts.

Figure 14:
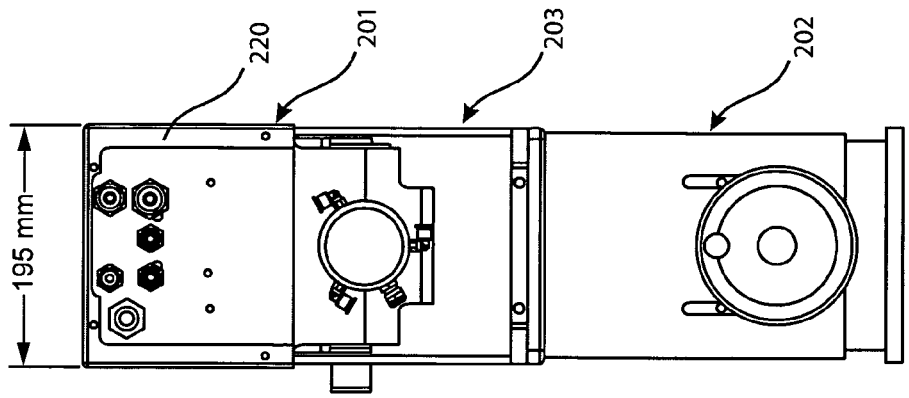
FIG. 14 is an end view of the pedestal-mounted advanced ultrasonic welding station of FIG. 13.
Figure 13:
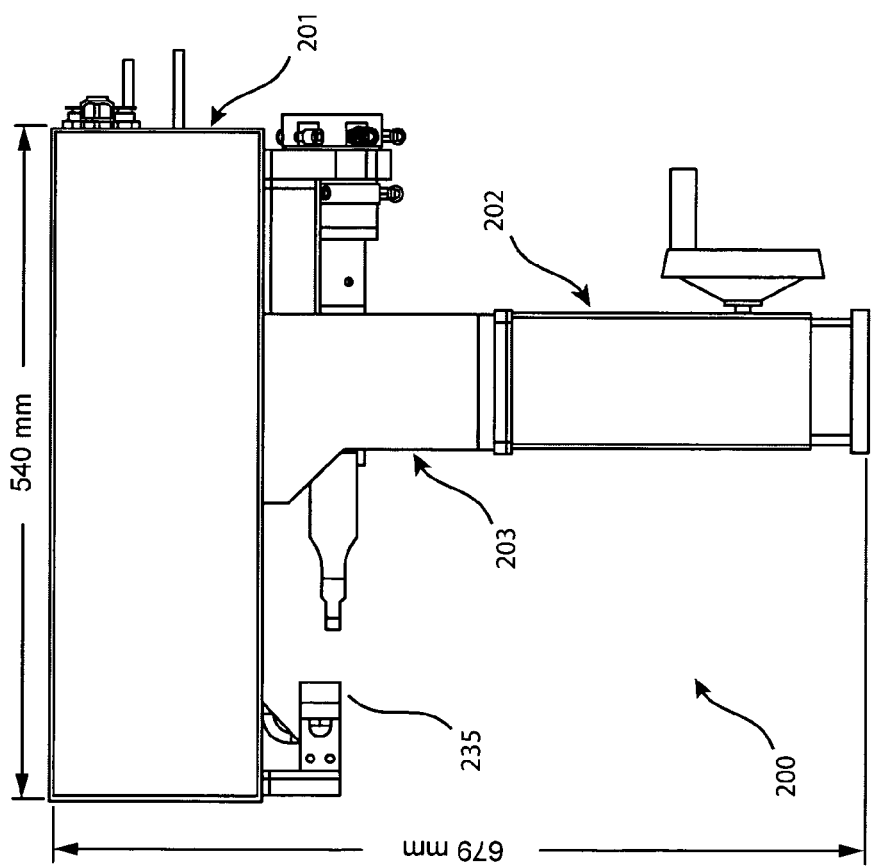
FIG. 13 is a side view of a third embodiment of a pedestal-mounted advanced ultrasonic welding station of the current invention.
Figure 15:
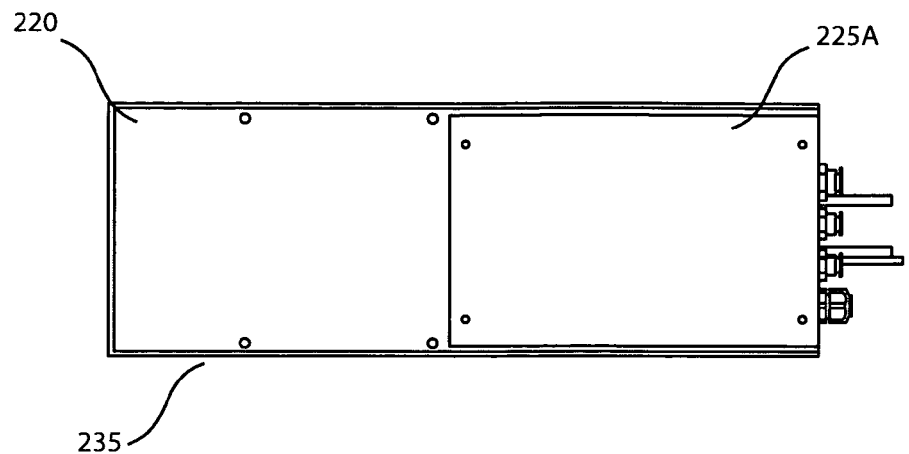
FIG. 15 is a top view of the pedestal-mounted advanced ultrasonic welding station of FIG. 13.
Figure 16:
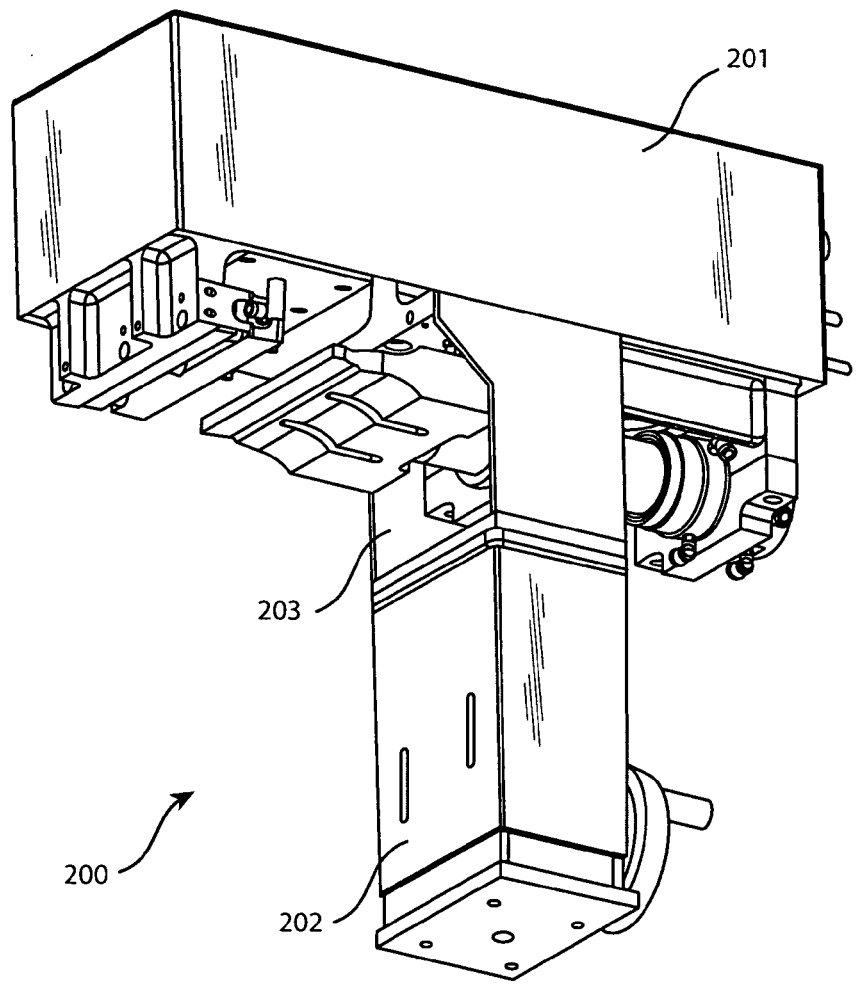
FIG. 16 is a perspective view of the pedestal-mounted advanced ultrasonic welding station of FIG. 13.
Figure 16A:
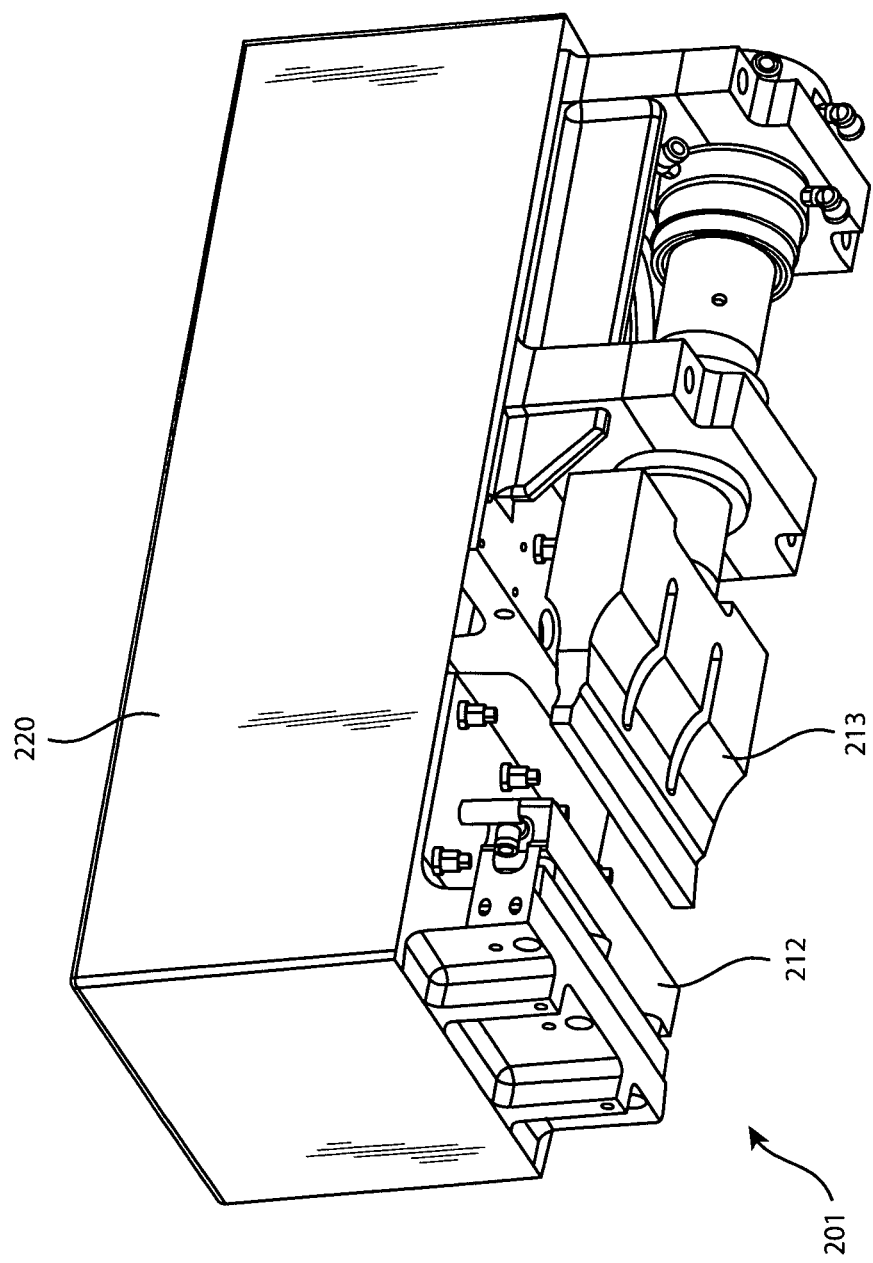
FIG. 16A is a perspective view of the advanced ultrasonic welding device of FIG. 16, prior to its assembly with the pedestal.
Figure 16B:
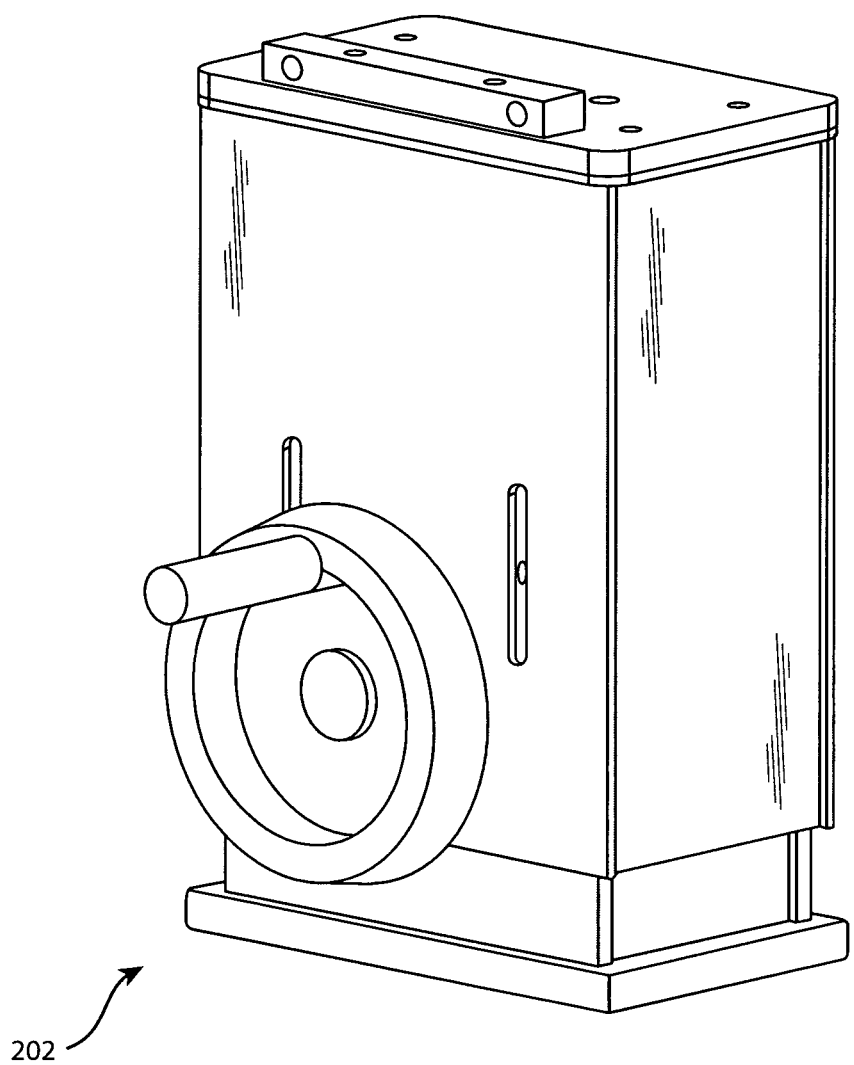
FIG. 16B is a perspective view of the pedestal, prior to its assembly with the advanced ultrasonic welding device of FIG. 16.

A third embodiment disclosed herein may be the pedestal-mounted ultrasonic welding device assembly 200 that is shown in the three views of FIGS. 13-15, and in the perspective view of FIG. 16. The pedestal-mounted ultrasonic welding device assembly 200 may include the welding device 201 (FIG. 16A), the pedestal 202 (FIG. 16B), and cradle brackets 203 to connect to and support the welding device from the pedestal. The ultrasonic welding device 201 may generally be constructed similar to the hereinabove disclosed device for retrofit kit 10 or 10A. However, welding device 201 may preferably be constructed to even further optimize its compactness, with a goal of readily permitting the unit to be utilized for replacement of the heat station or other sealing devices of an original equipment manufacturer (OEM), by meeting the envelope requirements of both the equipment previously placed in service and also the equipment that is being manufactured today.

Figure 18:
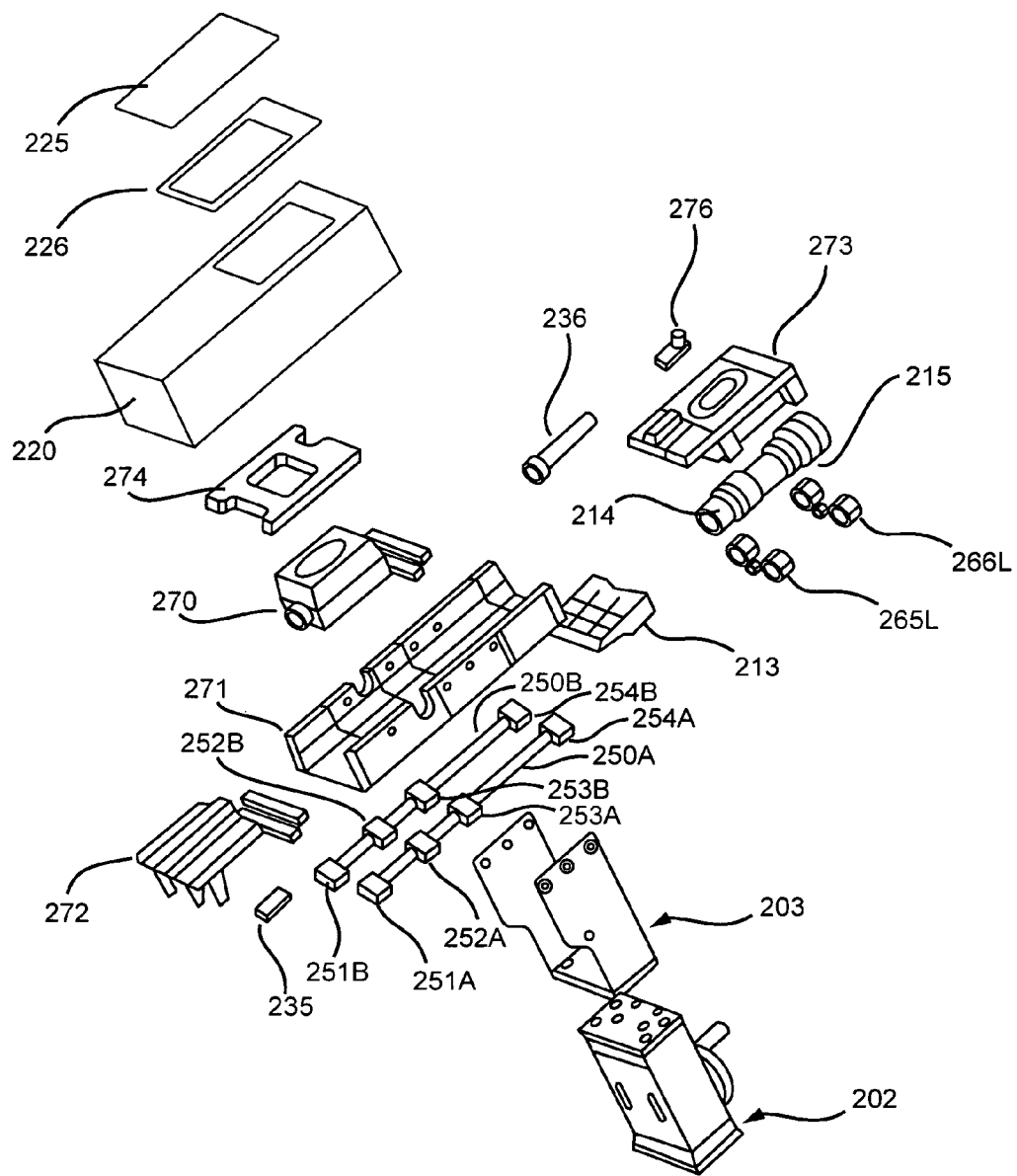
FIG. 18 is an exploded view of the component parts of the pedestal-mounted advanced ultrasonic welding station of FIG. 14.
Figure 18A:
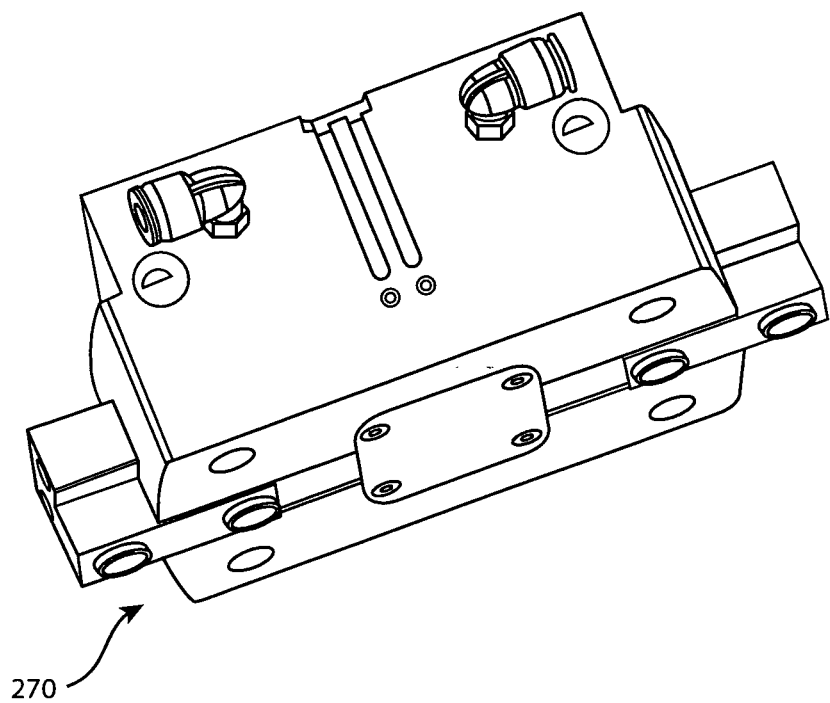
FIG. 18A is a side perspective view of the gripper.
Figure 18B:
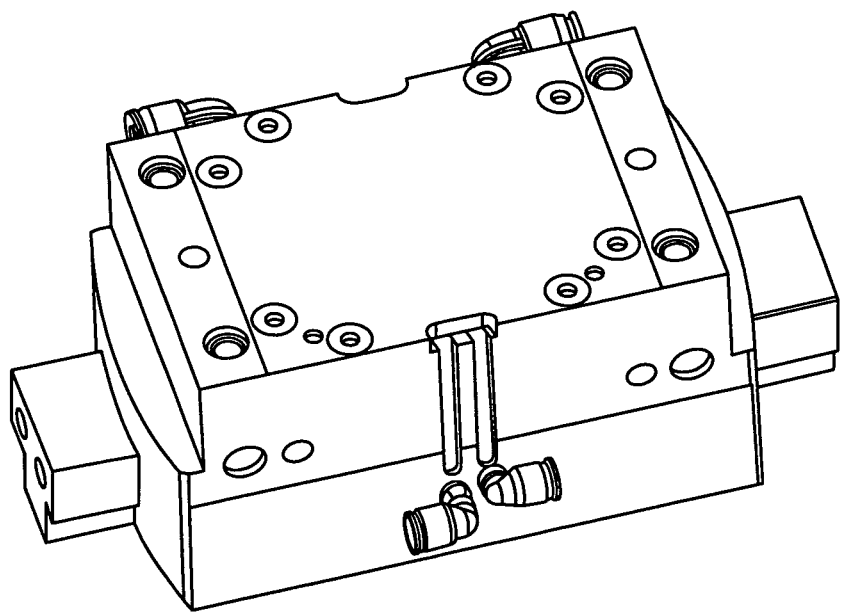
FIG. 18B is a bottom perspective view of the gripper.
Figure 20:
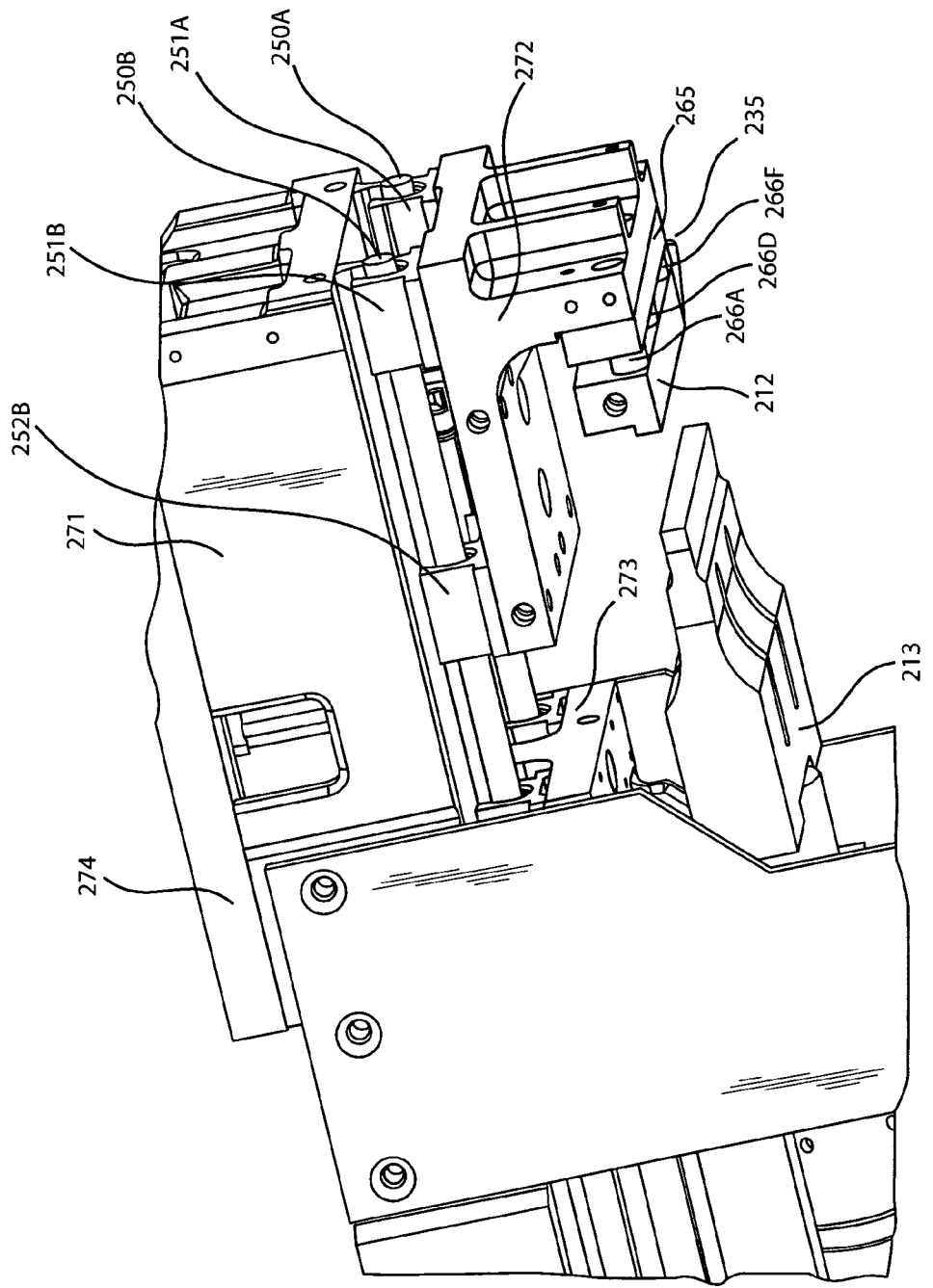
FIG. 20 is a perspective view of the pedestal-mounted advanced ultrasonic welding station of FIG. 13, showing the stainless steel linear rails and mounting members secured thereto.

Ultrasonic welding device 201, unlike the hereinabove disclosed device for retrofit kit 10 or 10A that used fluidic muscles, may instead utilize an off-the-shelf gripper—a pneumatic device that actuates the horn and anvil, to cause clamp-up upon the work pieces to be welded. The parallel gripper 270, model DHPS manufactured by Festo, is shown in FIGS. 18A and 18B, and may be utilized herein (see, www.festo.com/cms/nl-be_be/9767.htm, and U.S. Pat. No. 6,199, 848 to Bellandi, with the disclosures of each being incorporated herein by reference). As seen in FIGS. 18 and 20, the gripper 270 may be secured to the housing 271, which may be a casting, and the gripper may be secured using suitable mechanical fasteners and may also include the use of mounting plate 274. The anvil support member 272—the equivalent of the corresponding mounting member discussed hereinabove—may be fixedly secured to bearing carriages 251A, 251B, 252A, and 252B, and may thereby be driven to slide relative to the linear rails 250A/250B by its connection with one of the pistons of the gripper 270. Similarly, the stack support member 273, which supports the component parts of the stack—the sonotrode 213, booster 214, and converter 215—may be fixedly secured to the bearing carriages 253A, 253B, 254A, and 254B, and may thereby be driven to slide relative to the linear rails 250A/250B by its connection with the other piston of the gripper 270. It should be noted that the anvil support member 272 and the stack support member 273, each of which may be formed in a casting process for this embodiment, may each alternatively be configured to slidably mount directly to the linear rails 250A/250B without requiring the use the separate bearing carriages (251A, 251B, 252A . . . ). In addition, a single central rail, as opposed to the pair of rails linear rails 250A/250B, may also be successfully used, except that the use dual linear rails may offer added stability for movement of the advanced anvil and sonotrode.

Figure 17:
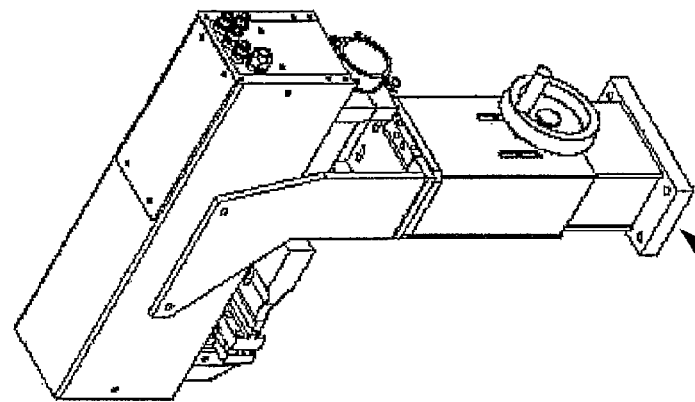
FIG. 17 is a perspective view of two pedestal-mounted advanced ultrasonic welding stations of the present invention, and the third embodiment of the pedestal-mounted welding station which has been optimized for integration into a highly space-limited envelope.
Figure 17:
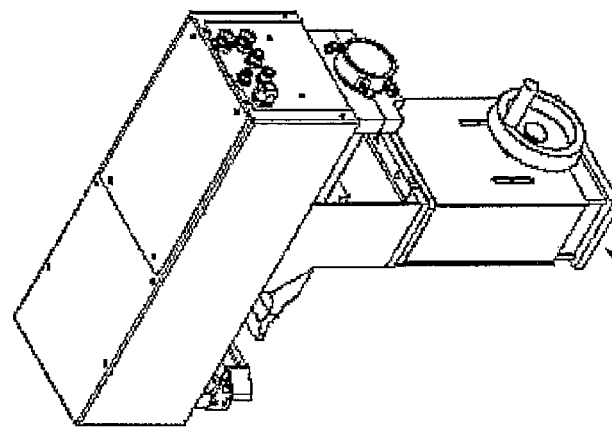
Figure 17:
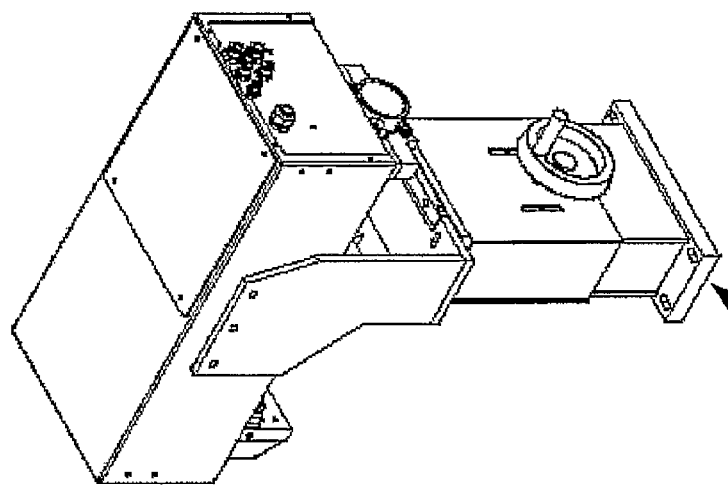

FIG. 17 shows three different versions of the pedestal mounted ultrasonic welding device of the present invention, including two versions—the one on the left-hand side (200Bi) and one on the right-hand side (200Bii)—which have the cradle brackets mounted to the exterior of the cover of the device, and ultrasonic welding device 200 being shown in the center of the figure, in which the cradle brackets 203 may instead mount to the housing 271 beneath the interior of the cover 220. This arrangement for device 200, along with other changes, results in an overall width of less than 200 mm for the device, as seen in FIG. 14, to thereby meet the space requirements of many OEMs, and which also permits removal of the cover 220 (FIG. 19A), without first requiring removal of the cradle brackets 203. A removable access panel 225 may be releasably secured to cover 220, as seen in FIGS. 19A and 19B, to permit quick access to flow controls and grease fittings, and may be used in conjunction with a nitrile food-grade gasket 226 to support wash-down of the device). A shallow height actuator in the pedestal 203 presently results in an overall height of the assembly of 679 mm (FIG. 13), while still permitting column height adjustments of 50 mm, and the present overall length of 540 mm provides for good clearance from the inner dial plate of more models of different OEM equipment (e.g., more clearance on the anvil side near the table dial).

Figure 19:
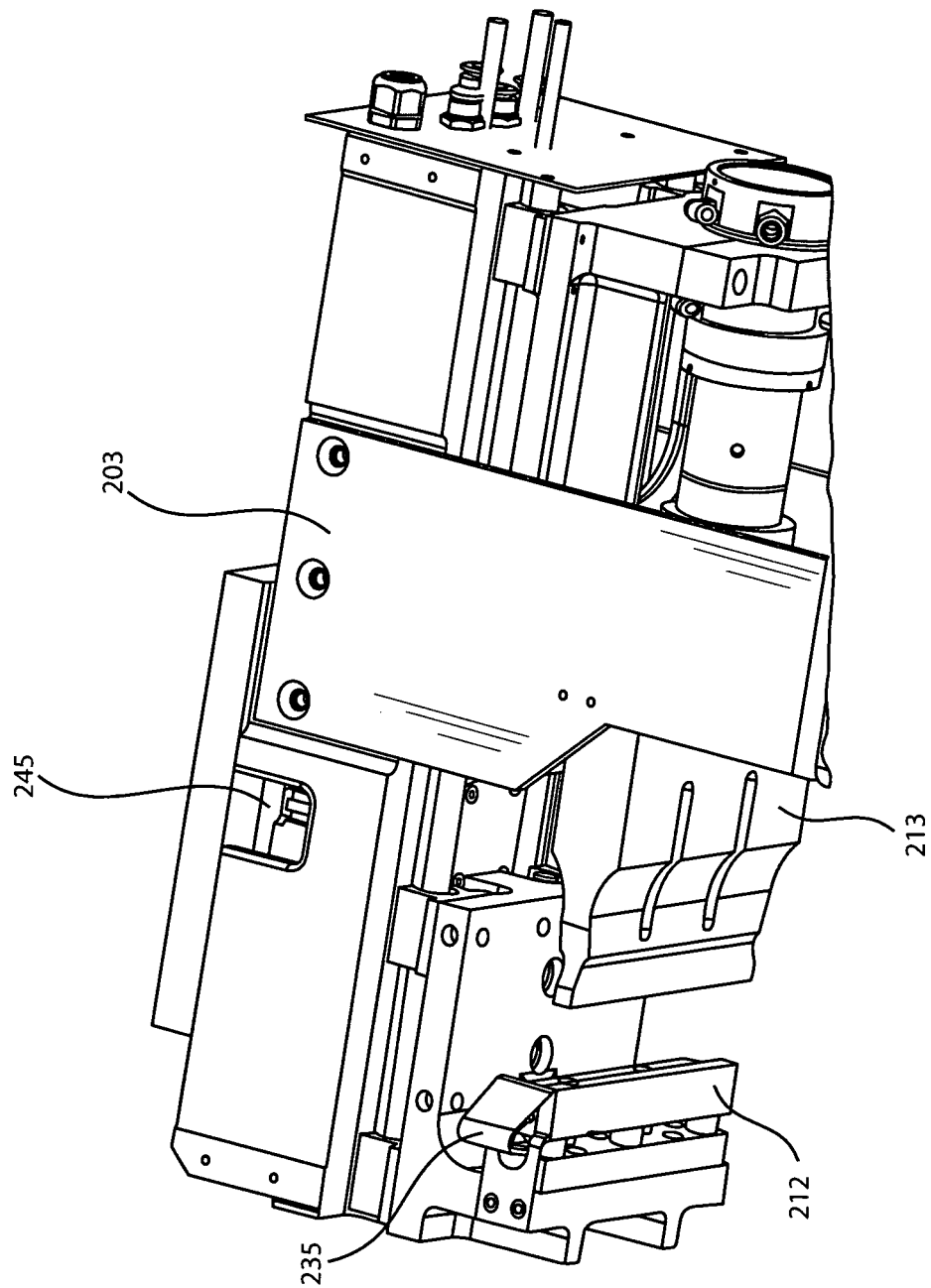
FIG. 19 is a perspective view of the pedestal-mounted advanced ultrasonic welding station of FIG. 13, showing an opening to permit access to the sensor.
Figure 19A:
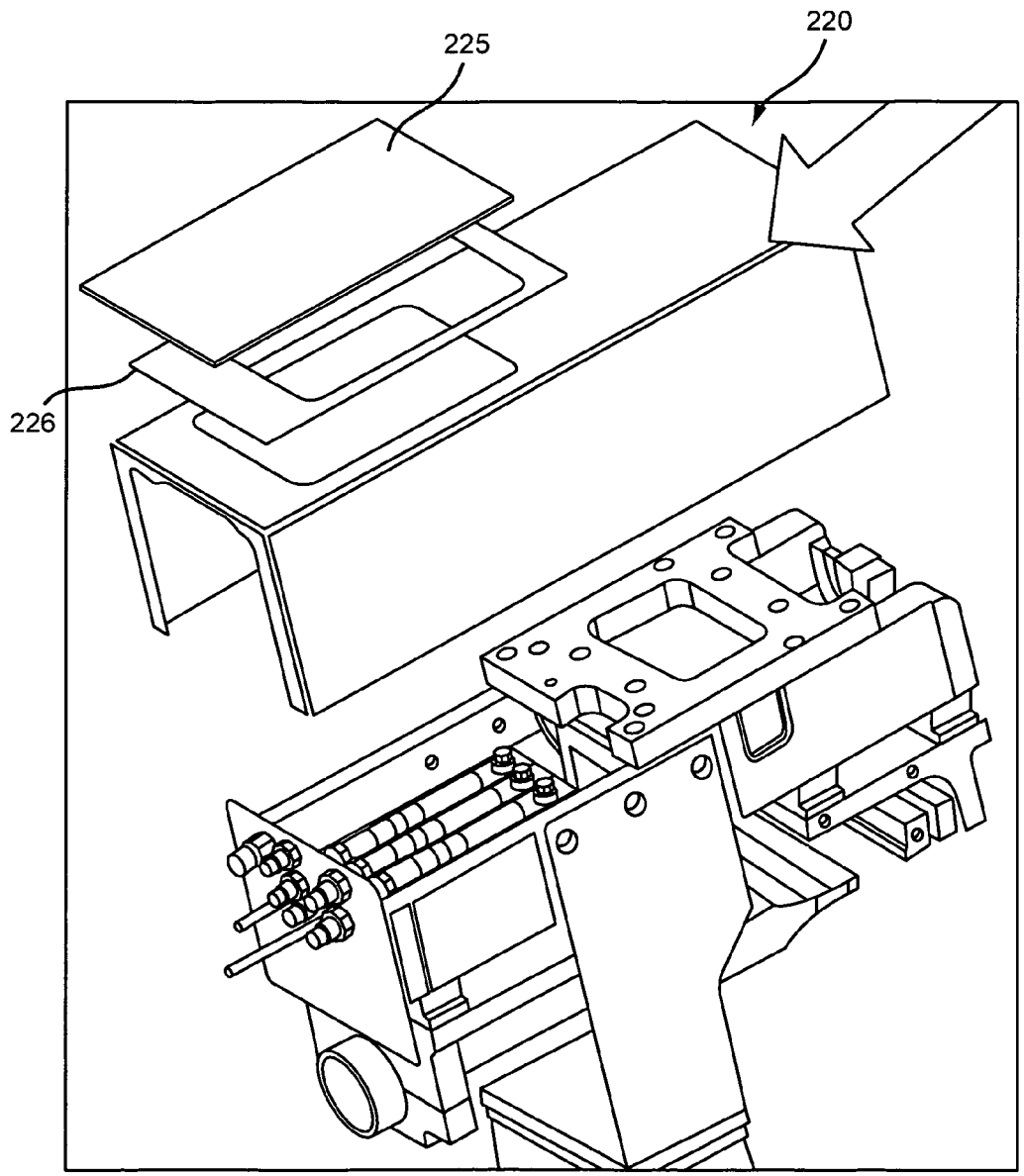
FIG. 19A is top perspective view showing the housing, gasket and top cover removed from the ultrasonic welding device to expose flow controls and grease fittings therein.
Figure 19B:
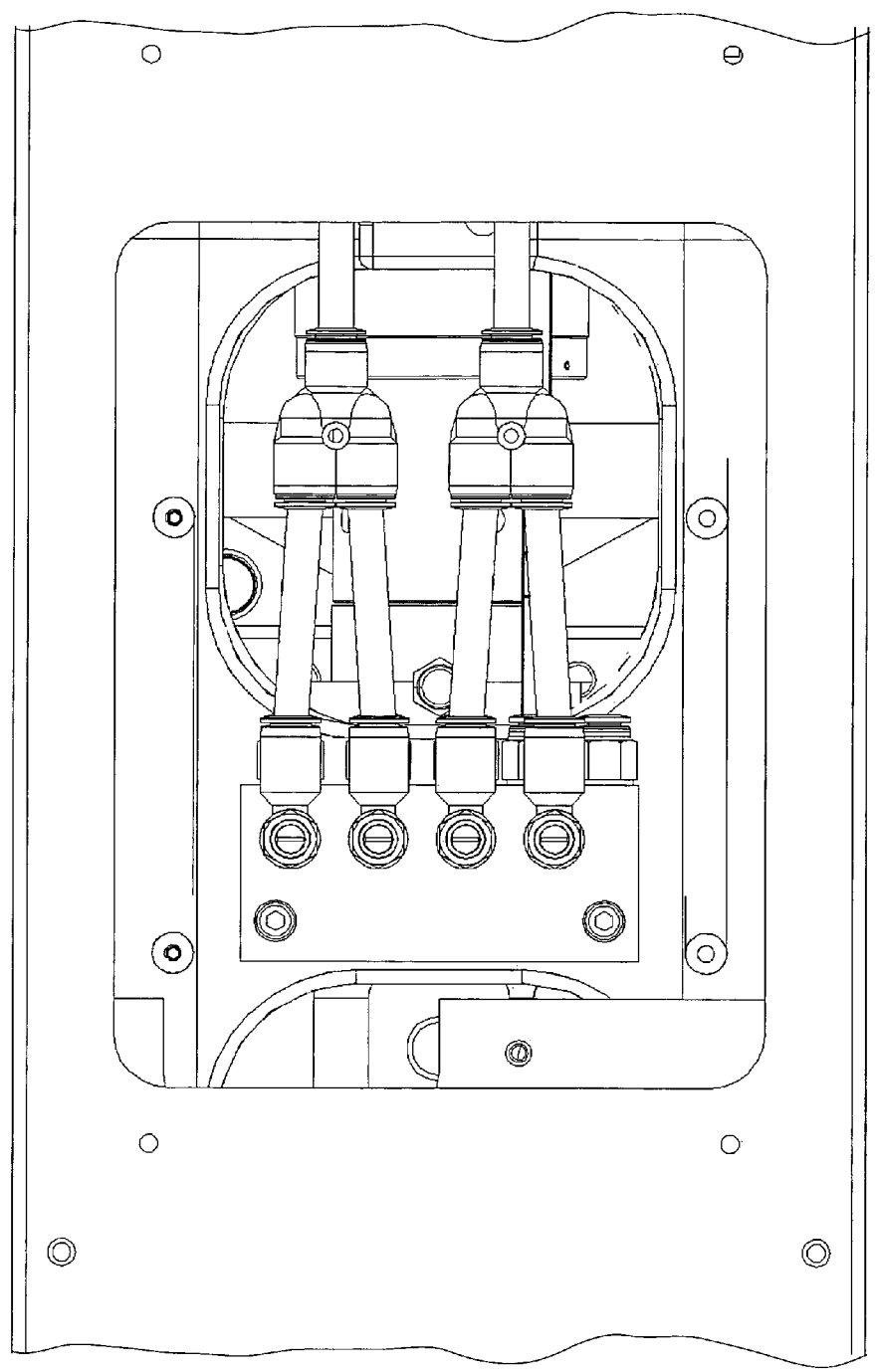
FIG. 19B is a top view of the flow controls and grease fittings of FIG. 19A.

The perspective view of FIG. 19 shows the advanced ultrasonic welding device 201 with the cover 220 removed to expose the open and close sensors 245. The open and close sensors may provide input to a microprocessor, indicating the position of the sonotrode—being either distal from the anvil (open) prior to the beginning of a cycle, or engaging the anvil (closed). The close sensor allows for programming in a delay time if needed to build up proper forces for welding, and/or to also coordinate the timing of the vibrations to occur during the point at which the work pieces are engaged between the sonotrode and anvil. In addition, one or more pouch presence sensors may also be used, because cycling the device and applying ultrasonic energy without a work piece or work pieces being positioned between the horn and anvil can severely damage the equipment. Therefore, pouch presence sensors ensure that the ultrasonic horn and anvil never fire directly against each other.

It is fairly common for such ultrasonic welding machines to be cleaned in a wash-down environment that may include the use of caustics, which had in the past been accommodated by anodizing the structural components to increase their corrosion resistance. However, the oxide layer created by the anodizing process tends to wear off quickly. Therefore, many of the structural components of the ultrasonic welding device assembly 200 (the castings used for the first and sonotrode and anvil support members, etc.—see FIG. 20) receive a food-grade ceramic reinforced Teflon® coating, which enables use of the device in a wash-down environment that includes caustics. The linear rails 50A and 50B of embodiments 10 and 10A have been replaced on device 200 with a pair of stainless steel rods 250A/250B and matching stainless steel bearing rails (250A, 250B, 251A, . . . ), to also better facilitate the exposure in the wash-down environment.

Figure 21:
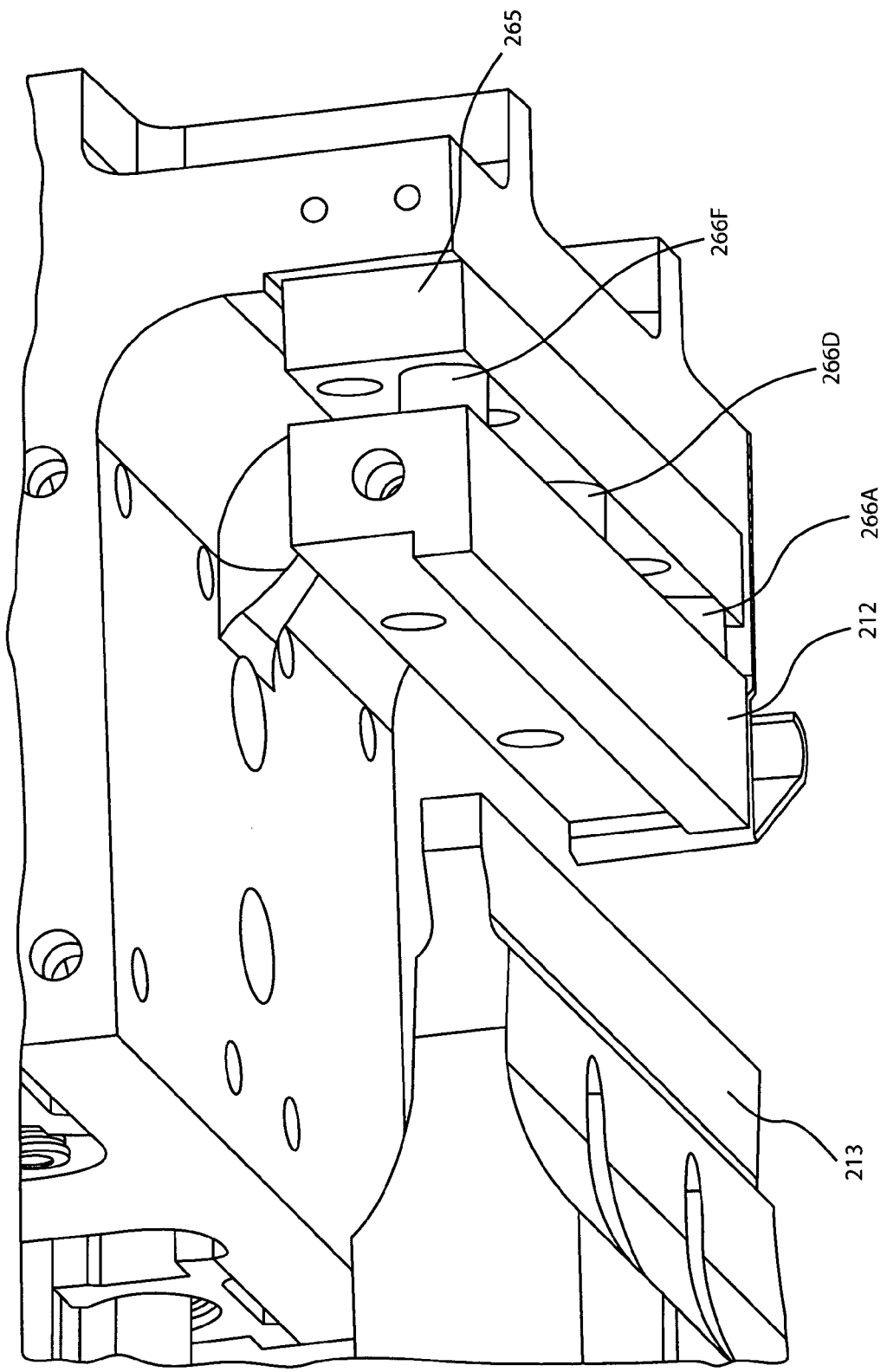
FIG. 21 is a perspective view of the pedestal-mounted advanced ultrasonic welding station of FIG. 13, showing the anvil, leveling feet, and mounting base enlarged.

The advanced anvil 212, the engagement surface of which may include the energy director grids described in co-pending application Ser. No. 12/925,652, may generally be reduced in overall height, as seen in FIG. 21. The height reduction accommodates the gripping of pouches, within the original equipment, at a position higher up on the pouch to nearly eliminate any "fold over" conditions (e.g., when a pouch is not guided properly into the weld station it can catch an edge and fold over and not be sealed properly or at all). The converter and booster are modified to be one contiguous assembly that will have an ingress Protection/International Protection rating of IP67 (6—generally indicating dust-tight, and 7 generally indicating durability for at least 30 minutes when immersed in one meter of water).

FIG. 21 is an enlarged detail view of the anvil 212, leveling feet 266A/266D/266F, and mounting base plate 265 of the pedestal-mounted advanced ultrasonic welding device 200. Adjustments using the leveling feet may be understood through an examination of FIGS. 22A-22F. FIG. 22A shows the leveling foot 266F having been threadably received within an internally threaded hole in the anvil 212. The other leveling feet (266A-266E and 266G) may similarly be threadably received within corresponding threaded holes in the anvil 212. The anvil 212 with leveling feet secured thereto may next be placed over the mounting base plate 265 to generally align the leveling feet with the corresponding holes in the base plate, as seen in FIG. 22B. A holding screw 268 may then be used to secure the anvil to the mounting base plate 265 at each of the leveling feet locations.

With the anvil 212 so installed upon the ultrasonic welding device 201, as seen in FIG. 21, proper uniformity of the depth of engagement of the sonotrode 213 with the anvil 212, to produce the narrow ultrasonic weld having improved durability and integrity, may next be assured through adjustments to the leveling feet. To ascertain what adjustments may be necessary, a pressure sensitive film may be positioned in the plane where the work pieces would normally be acted upon during the welding process, while a single stroke of the sonotrode and anvil may be manually indexed, to thereby make an impression upon the film. The film that may desirably be utilized is available from Sensor Products, Inc., in Madison, N.J. After mannually indexing the anvil and sonotrode, an examination of the film will reveal the resultant grid pattern impression from the engagement of the energy director grids of the sonotrode and anvil, which should be uniform in both the top to bottom (short) direction, as well as in the left to right (lengthwise) direction. If the impression is not uniform, the depth of engagement may be adjusted locally, by adjusting the nearest leveling foot. For example, FIG. 22G shows the impression made on a piece of film, in which there generally a uniform pattern, except for a region in the bottom right corner, in which the was an insufficient amount of contact, resulting in little to no impression being made in that region. An adjustment for such a regional non-uniformity is shown in FIGS. 22C-22F. The holding screw 268 in the corner corresponding to the insufficient contact may be loosened, for example by being loosened one-quarter of a turn (FIGS. 22C-22D), then the leveling foot may be used to raise (or alternatively lower) the anvil locally by being rotated with the application of a wrench upon the flats of the hex portion of the leveling foot (FIGS. 22E-22F). In this case, the leveling foot is backed away from the anvil to cause greater engagement between the anvil and sonotrode at that position. The holding screw 268 may next be re-tightened; with the verification process repeated using another piece of pressure sensitive film, until optimum results have been obtained, such as the uniform pattern illustrated in FIG. 22H.

Figure 22:
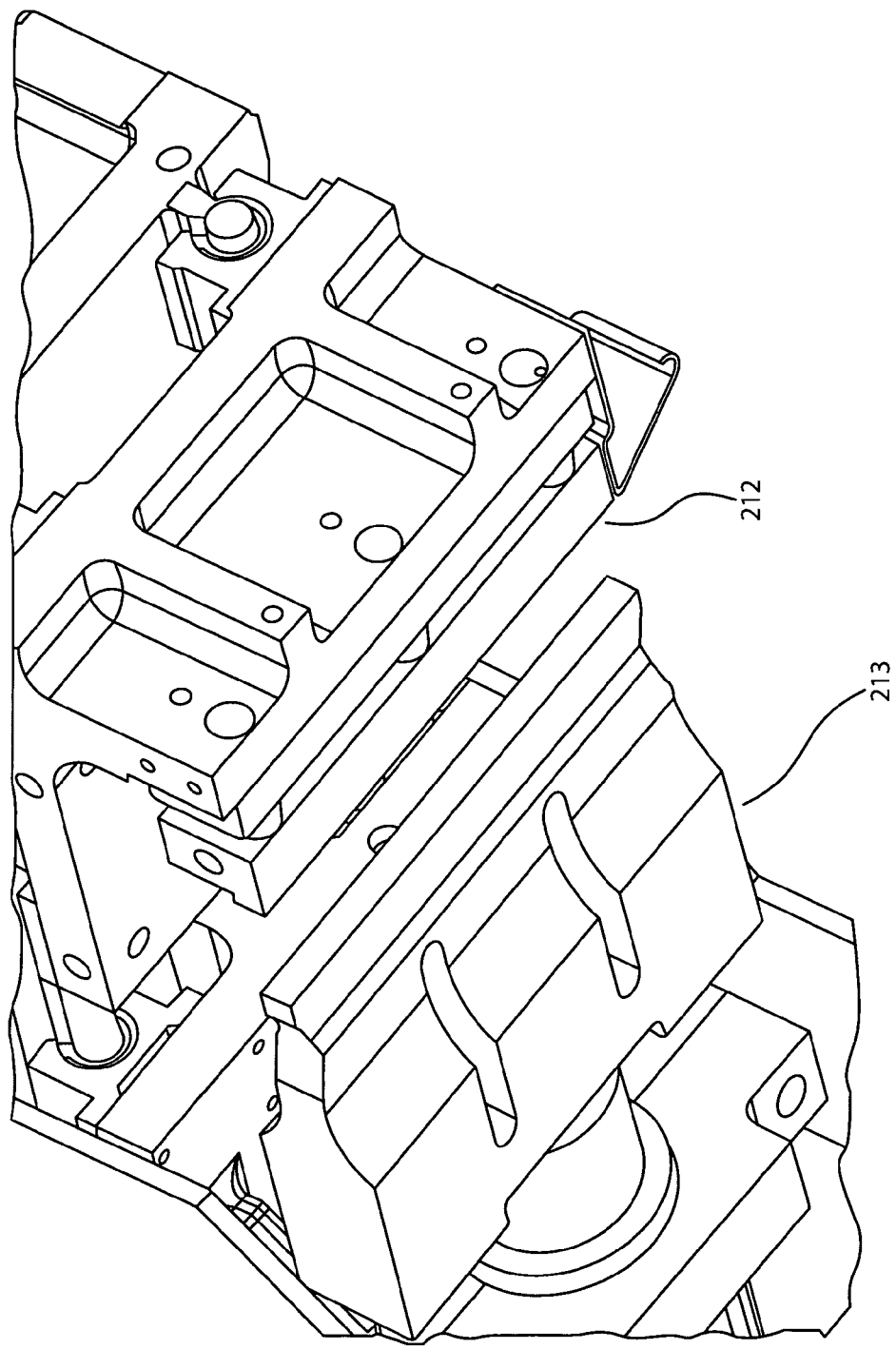
FIG. 22 is a reverse perspective view of the anvil, leveling feet, and mounting base of FIG. 21.
Figure 22:
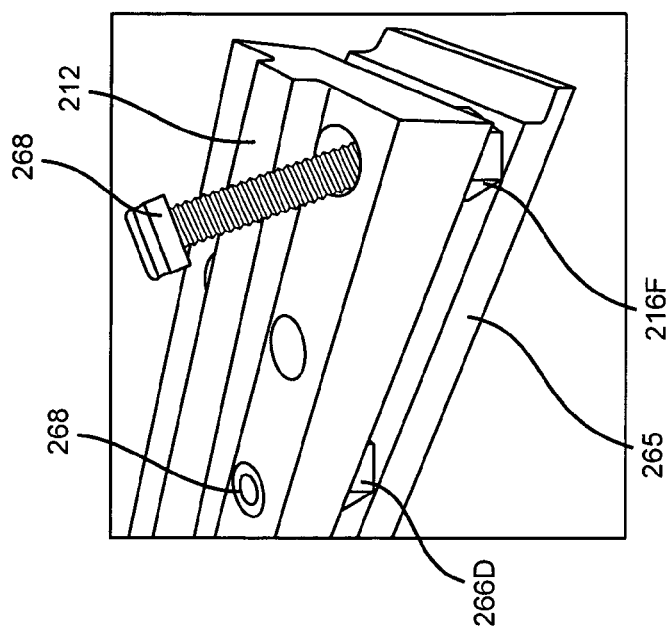
Figure 22:
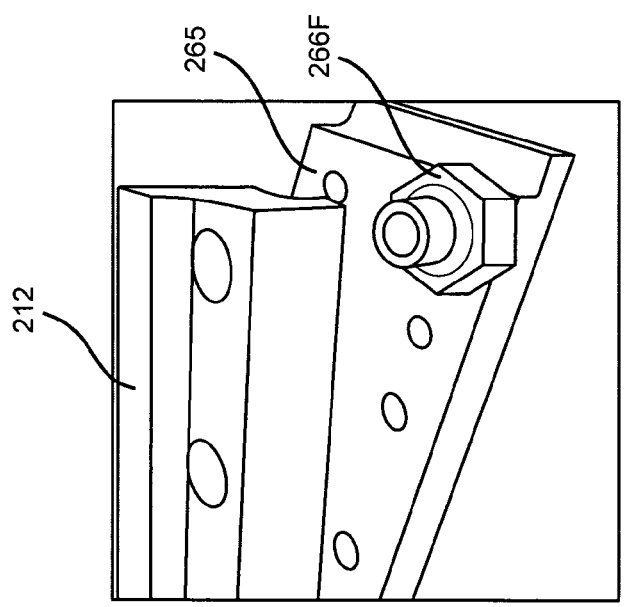
Figure 22:
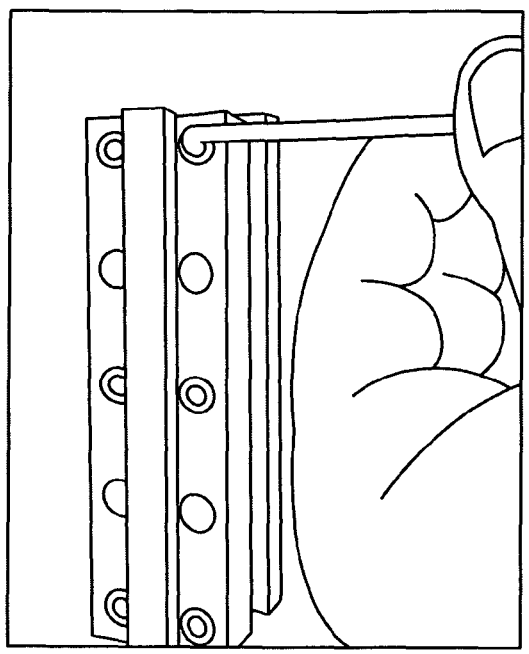
Figure 22:
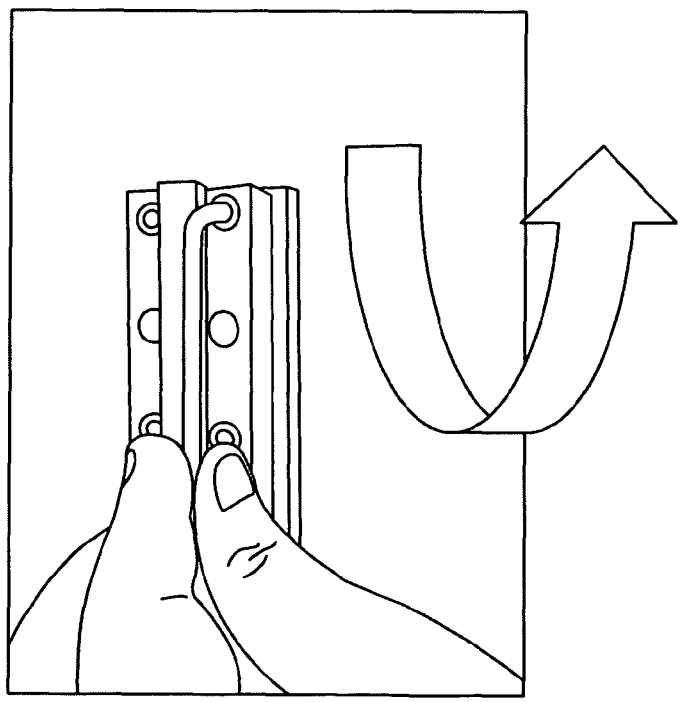
Figure 22:
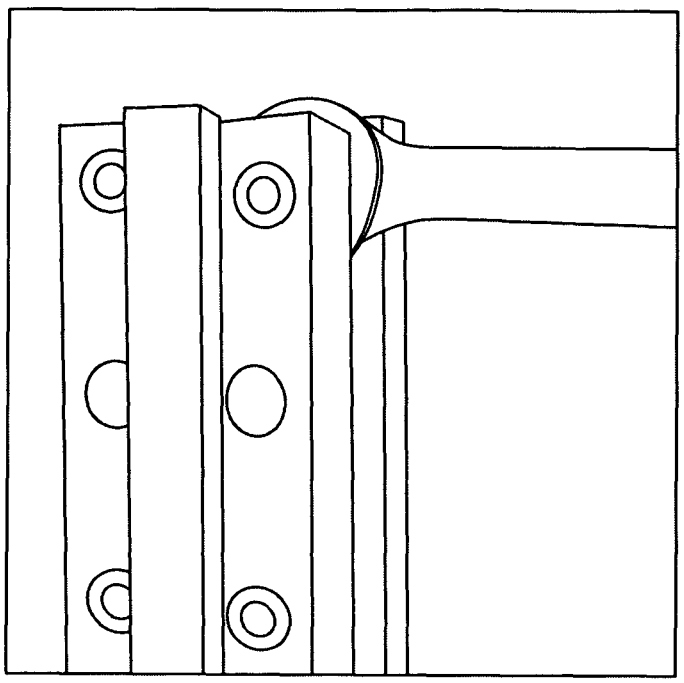
Figure 22:
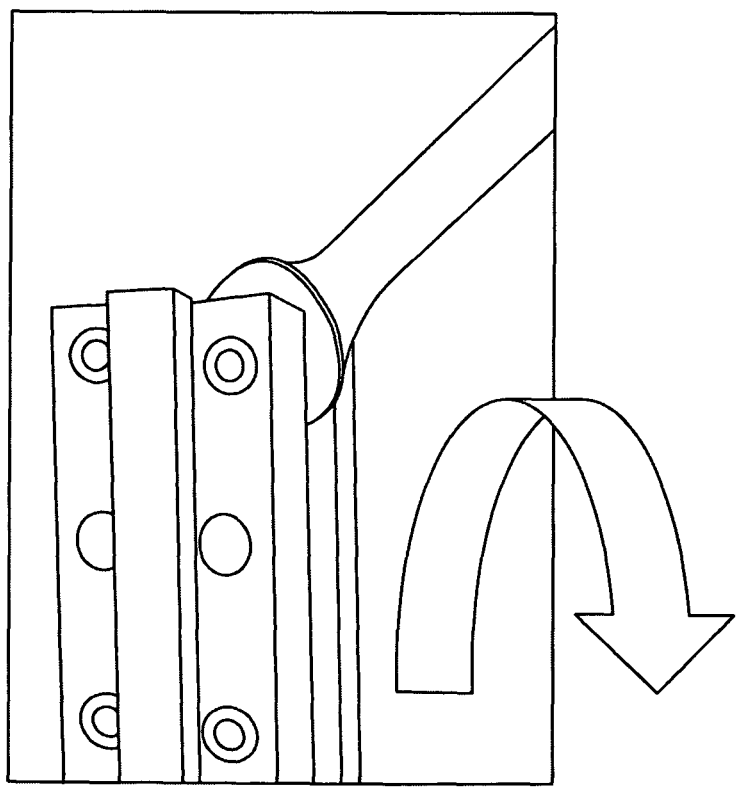
Figure 22G:
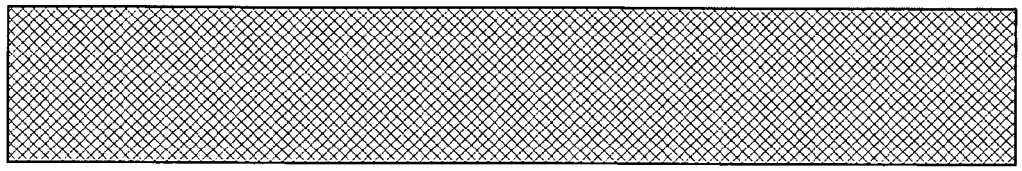
FIG. 22G illustrates a non-uniform impression pattern formed in a pressure sensitive film, after having been engaged between the advanced sonotrode and anvil of the present invention.
Figure 22H:
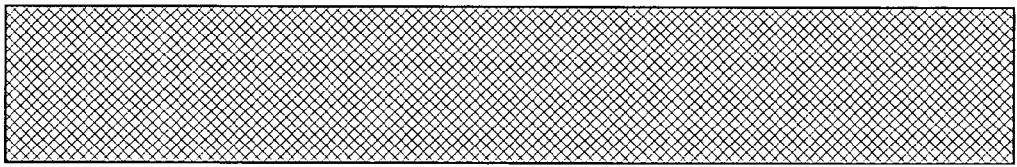
FIG. 22H illustrates a uniform impression pattern formed in a pressure sensitive film, which was engaged between the advanced sonotrode and anvil that produced the impression of FIG. 22G, but after the anvil was adjusted using a leveling foot of the present invention.

As seen in FIG. 21, two of the holding screws 268 may be loosened/tightened from the front side of the anvil, and, as seen in FIG. 22, three of the holding screws 268 may be loosened/tightened from the back side of the anvil—an arrangement that resulted from the size reduction in the anvil to meet the space requirements of certain OEM equipment. Also, adjustments to the leveling feet are more conveniently made by staggering the positioning of the leveling feet across the mounting plate, which nonetheless provides sufficient support for the anvil, while providing better wrench access to rotate the hex portion of the feet.

Figure 23:
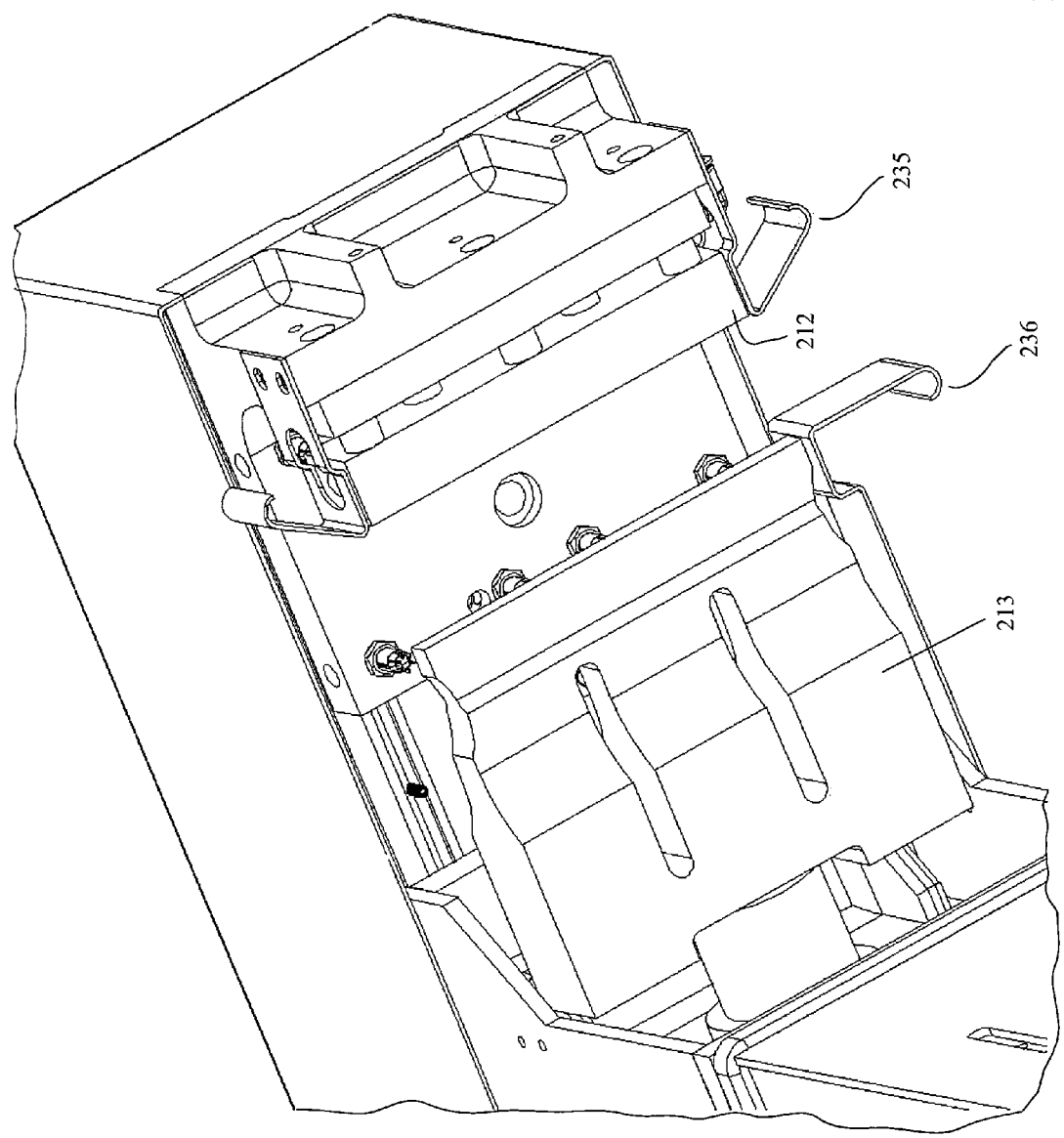
FIG. 23 is a bottom perspective view of the anvil, leveling feet, and mounting base of FIG. 21.
Figure 24:
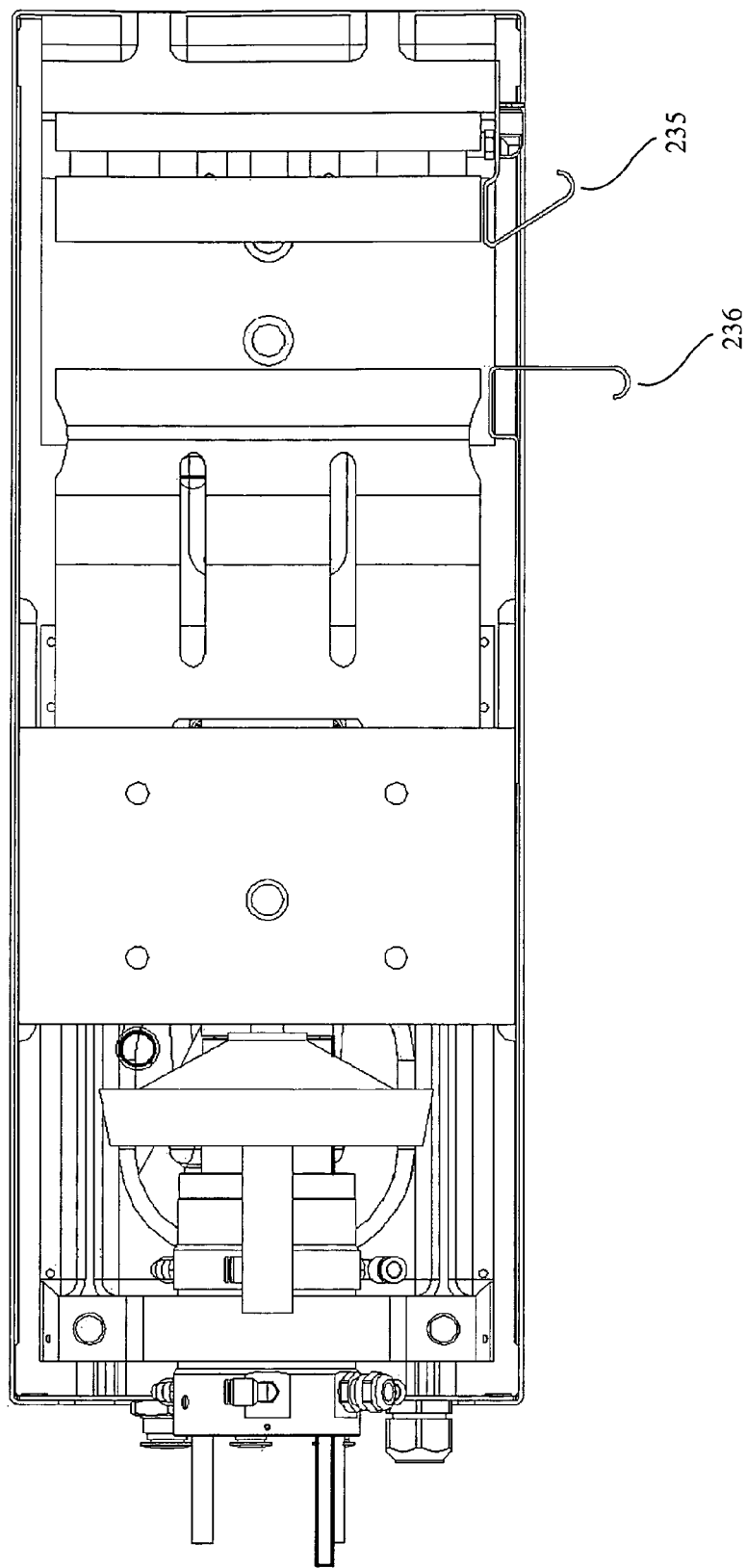
FIG. 24 is a bottom view of the pedestal-mounted advanced ultrasonic welding station of FIG. 13.

On the ultrasonic welding device 201, a narrower jaw opening is facilitated by the addition of pouch guides 235 and 236 (see FIGS. 23-24). The pouch guides help to assure clearance of the pouches with the anvil/sonotrode during the relative motion therebetween. The anvil pouch guide 235 may be mounted directly to the anvil support member, while pouch guide 236, which is configured to assure clearance of the film with the sonotrode 212, may be fixedly mounted to the cradle bracket 203. Using pouch guides 235 and 236 permits use of the narrower jaw opening, which serves to reduce the stroke of the sonotrode down to a minimum, which improves the speed at which the ultrasonic welding device 201 may operate. If the "jaws" of the device (engagement surfaces of the sonotrode and anvil) were opened wider, it would consequently take longer to close them for each sealing cycle.

Figure 26:
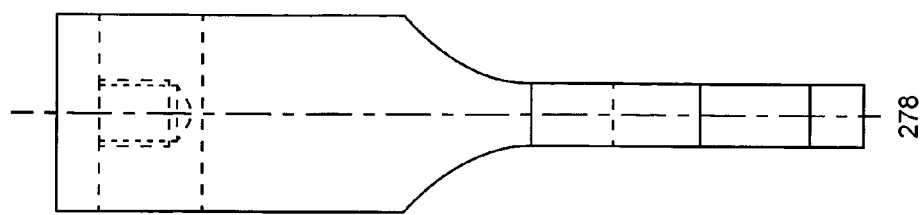
FIG. 26 is a side view of the improved sonotrode of FIG. 25.
Figure 25:
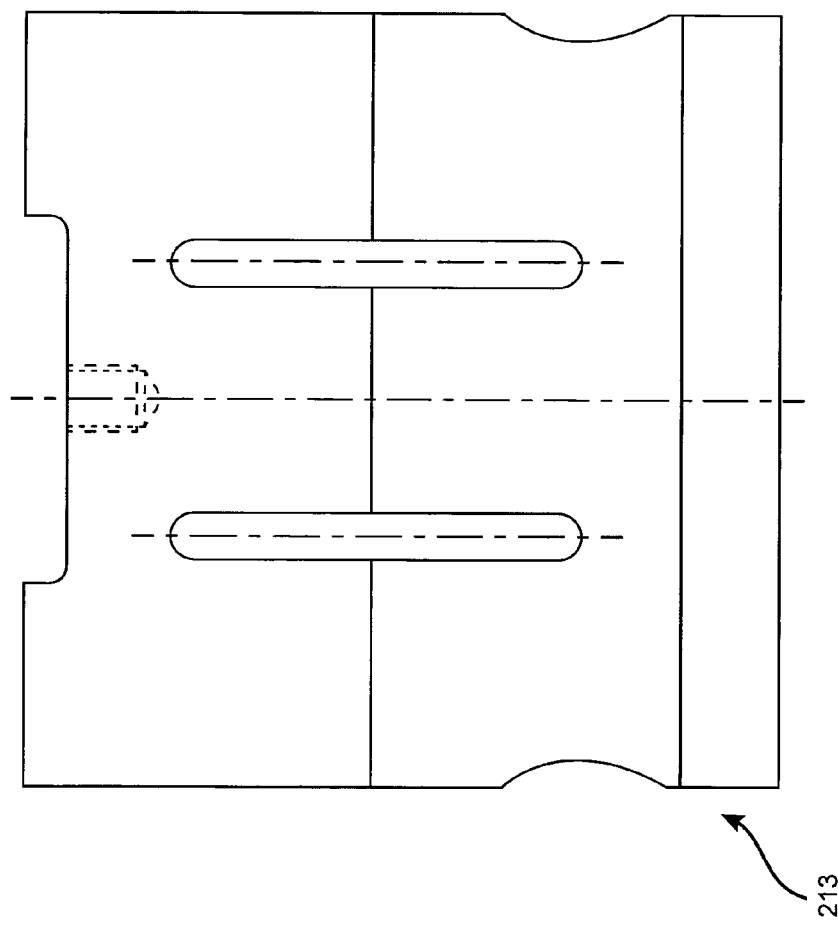
FIG. 25 is a front view of an improved sonotrode of the current invention.
Figure 27:
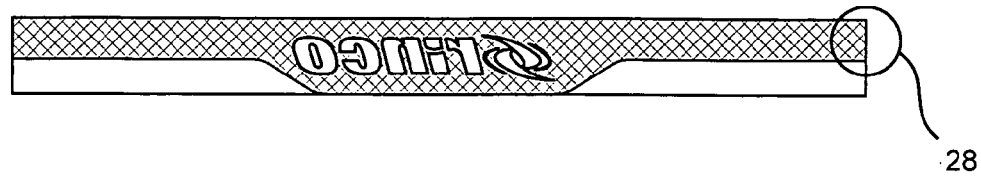
FIG. 27 is a bottom view of the improved sonotrode of FIG. 25.
Figure 31:
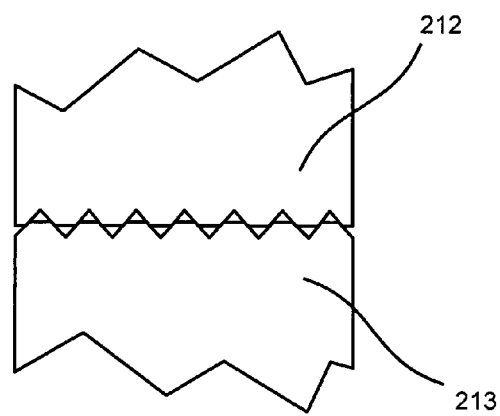
FIG. 31 shows the interlocking alignment of the energy director plateaus of the sonotrode with those of the anvil, per the arrangement of FIG. 30.

A further improvement may also be made to the advanced anvil and sonotrode that are found in our co-pending application Ser. No. 12/925,652, the details of which are briefly reiterated here in order to more aptly describe the improvement thereto. FIGS. 25-27 show three views of the improved sonotrode 213, which may have an engagement surface 278. As with the invention of the co-pending application, the sonotrode and the corresponding anvil herein may each also comprise a plurality of specially constructed energy directors 279 that may be arranged into a coordinated three-dimensional grid pattern, being coordinated between the sonotrode and anvil. The coordinated pattern may selectively increase the total surface area of the anvil that may be capable of distributing vibrations in a three-dimensional pattern of vibration-transmissive contact with the sonotrode, and which may also cause a discrete amount of deformation of the work pieces during the sonotrode-to-anvil engagement (FIG. 31). The deformation may preferably be limited to a small amount, and therefore be limited to maintaining the work pieces within the elastic range of the material. The increase in surface area of contact may depend upon the width of the plateau surfaces used, as described hereinafter. The three-dimensional contact pattern may be understood by an examination of FIG. 28 and FIG. 29.

Figure 28:
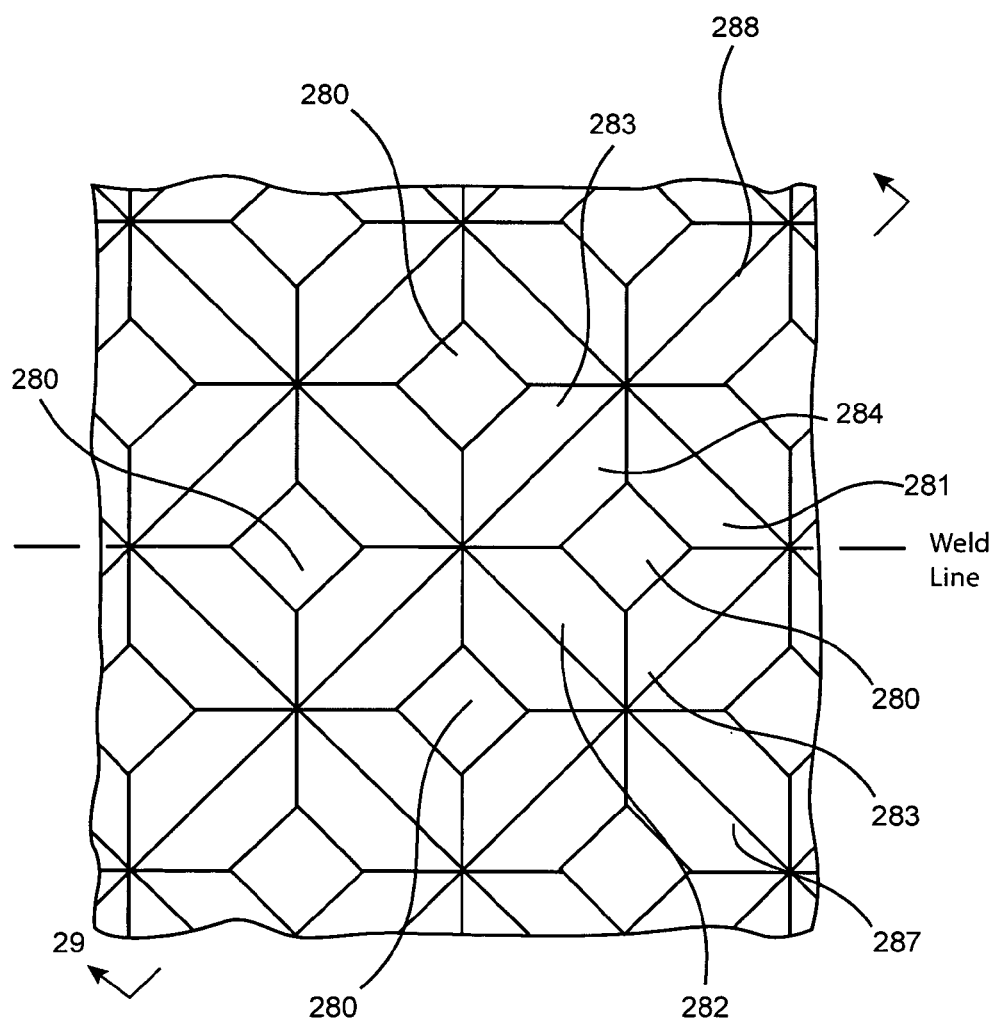
FIG. 28 is an enlarged detail view of the engagement surface for the sonotrode shown in the bottom view of FIG. 27.

The energy directors 279 of the sonotrode 213 may be regularly spaced apart from each other, as seen in FIG. 28. The energy directors 279 may preferably be spaced apart in a first direction that may parallel the weld line, and may similarly be spaced apart in a second direction being generally away from, or orthogonal to, the weld line, to form the grid pattern. Each of the energy directors 279 may comprise a plateau surface 280 that may be formed by a first angled side surface 281, a second angled side surface 282, a third angled side surface 283, and a fourth angled side surface 284, where the plateau surfaces 280 may each comprise a rectangular-shape that may be oriented at a 45 degree angle to the weld line. At the meeting of adjacent side surfaces 281 and 282 of the adjacent plateau surfaces 280, there may be a valley bottom or trough 287 that may be oriented at a minus 45 degree angle with respect to the weld line, and at the meeting of the adjacent side surfaces 283 and 284 of adjacent plateau surface 280, there may be a trough 288 that may be oriented at a plus 45 degree angle with respect to the weld line. The trough may be a line formed by the intersection of two planar surface, or it may be a radiused surface.

The rectangular-shaped plateau surface 280 lends itself very well to a repetitive pattern of engagement between the sonotrode and anvil, described hereinafter; however, other geometric plateau shapes may also be utilized, which would naturally alter the side-surface arrangement. Also, the rectangular-shaped plateau surfaces 80 may each be generally flat, although contoured plateau surfaces 80A may alternatively be utilized.

Figure 29:
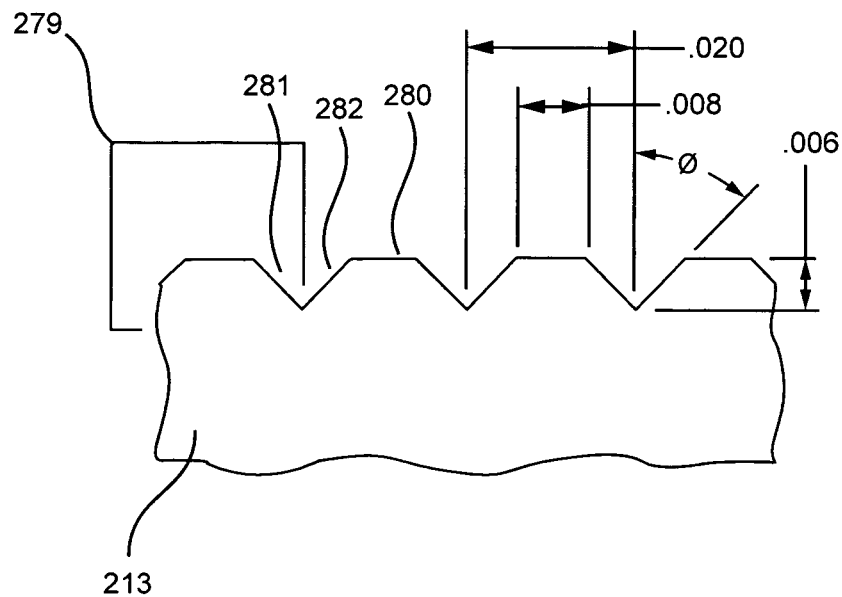
FIG. 29 is a section cut through the engagement surface of FIG. 28.

As seen in FIG. 29, the energy directors 279 of the sonotrode 213 may have a span therebetween of 0.020 inches, and may have a depth of 0.006 inches from the plateau surface 280 to the troughs 287/288, which may be formed using a conventional machining process or through the use of a wire EDM process. The angled side surfaces may each be at an angle θ, which may be different for various configurations, but in the first embodiment, angled side surfaces 281, 282, 283, and 284 may be oriented such that the angle θ is a 45 degree angle, which, when resolved geometrically, would result in the width of the plateau surfaces 280 being 0.008 inches. Since the dimensions of the energy directors 279 may not necessarily be very large with respect to the material thicknesses being welded, the amount of deformation, discussed earlier, may similarly not be very large, and thus does not generally pose an issue as to tearing of the material of the work pieces.

Figure 30:
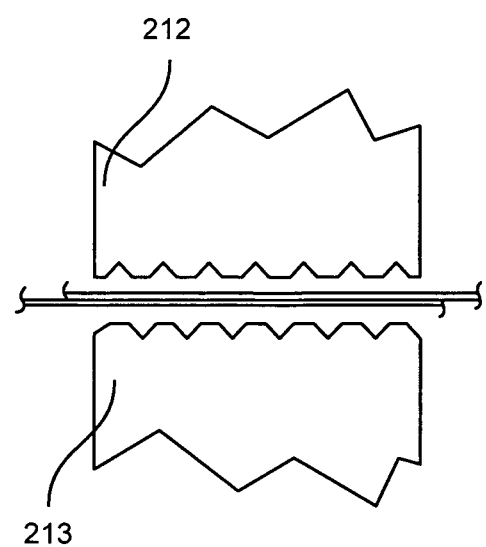
FIG. 30 is a section cut through the improved sonotrode and anvil of the current invention, shown prior to engaging work pieces, where the engagement of the sonotrode energy director plateaus are aligned to interlock with the anvil energy director plateaus.
Figure 30A:
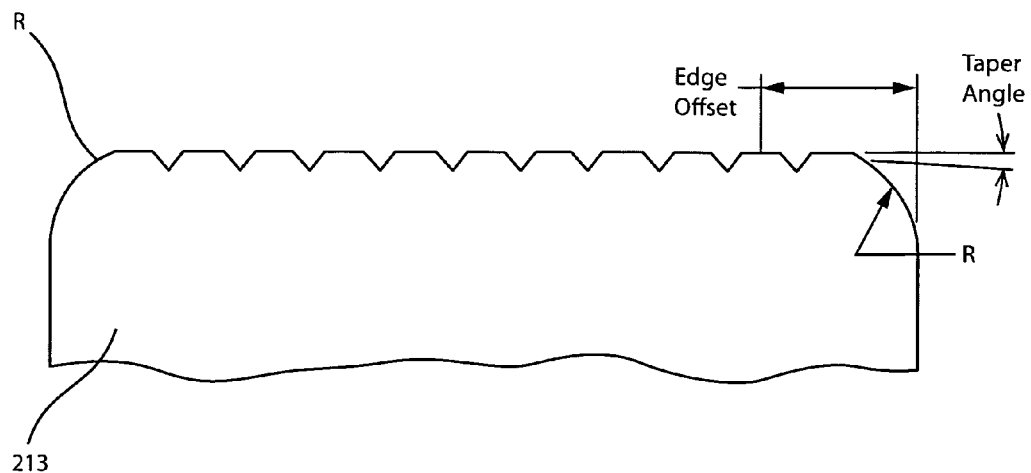
FIG. 30A is a section cut through the improved sonotrode of the current invention, illustrating the types of end transitions successfully used on both the sonotrode and anvil.

The anvil may have corresponding energy directors, and may similarly include plateau surfaces, as well as the associated side surfaces. The improved sonotrode 213 and anvil 212 may be constructed to have engagement therebetween of energy directors which include a greater surface area of contact created by the corresponding side surfaces, than the traditional flat surfaced sonotrode contacting a flat surfaced anvil. This increased surface area of contact, which may be seen in FIG. 30 just prior to engagement of the sonotrode and the anvil with the work pieces, and in FIG. 31 by the direct contact and the anvil with the sonotrode without any work pieces therebetween, may cause minor deformation immediately prior to application of ultrasonic vibrations, which results in a more durable seal from such ultrasonic welding of two work pieces. Also, the plateau surfaces may preferably transition at the boundaries of the sonotrode and anvil, as seen in FIG. 30A. The transitions may include a corner radius preferably being in the range of 0.030-0.046 inches. Furthermore, the plateau surfaces may also taper down toward those radiused corners, beginning at an offset of approximately 0.062 from the edge, and having an angle of taper preferably in the range of one to two degrees.

The engagement surfaces of these energy director grids for both the sonotrode and anvil are preferably coated with a food-grade ceramic reinforced Teflon® coating, to prevent sticking of the thin plastic film thereto, as a result of the heating/melting that occurs during the ultrasonic welding process, particularly where a fold over condition has occurred. Since those values for the configuration of the energy directors represent final dimensions after coating, the machined dimensions of those parts are correspondingly smaller to account for the thickness of the coating.

The alignment of the anvil and sonotrode, being advantageous for thinner work pieces to dramatically improve weld durability, may utilize such alignment between the energy director grids where the side surfaces of the sonotrode plateaus interlock with the side surfaces of the anvil plateaus (FIG. 31) in a repeating 3-dimensional pattern, which may cause minor elastic deformation of the work pieces prior to or during ultrasonic welding. When the work pieces are inserted between the sonotrode and anvil (FIG. 30), and pressure is applied between the anvil and sonotrode, along with suitable vibrations provided by the design of the particular sonotrode, a three-dimensional weld results. The three-dimensional weld exhibits significantly improved durability over that of conventional ultrasonic welds. Depending on the length of the plateau surface utilized on both the anvil and sonotrode, the surface area of contact may be increased considerably. Where a relatively small plateau surface is used, perhaps even somewhat smaller than the one illustrated in FIGS. 29 and 31, the surface area of contact may be significantly increased, and may therefore serve to further reduce the weld times and may also serve to further improve the weld quality/durability.

An improvement to the above described sonotrode and anvil with grids of energy directors thereon, is shown initially within by the engagement surface of the sonotrode that is seen in FIG. 27. The grid pattern may be selectively interrupted to locally produce a smooth weld that resembles the logo of the company marketing the particular product to be sealed within the pouch. It should be noted that the use herein of the term "logo" is meant to convey any graphic representation or symbol of a company's name, product, trademark, abbreviation, etc., or any other design or information for which it is desirable to have visibly highlighted.

Figure 32:
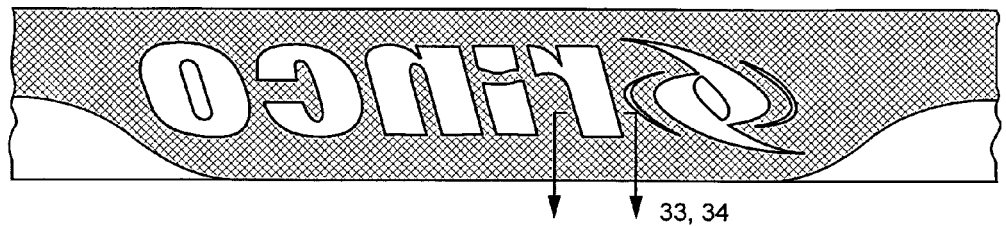
FIG. 32 is the bottom view of the improved sonotrode of FIG. 27 shown enlarged.

FIG. 32 shows an enlarged detail view of the logo of FIG. 27—the name "rinco" and an adjacent symbol. The "rinco" logo may be produced using one of several different approaches. In a first approach, the anvil may have energy directors distributed across its entire engagement surface, without interruption, while the sonotrode may have a plurality of logo surfaces machined into the energy directors of its engagement surface to thereby spell out "rinco." Instead, the logo surfaces, which may preferably be flat, may be machined into the engagement surface of the sonotrode, while the anvil may have energy directors distributed across its entire engagement surface. With either of these approaches, the weld of increased durability produced by engagement between the energy directors may result in a textured seal surface on both sides of the joined work pieces, except for the region of the work pieces that were proximate to the logo surfaces, where the thin film may still be smooth on each of the two sides. However, with either of these two approaches, despite the fact that the work pieces are not engaged locally within the region that results in the spelling of the logo "rinco" and are generally not sealed thereat, there may sometimes nonetheless be some transmission of vibrations and a correspondingly small amount of melting therein to produce within the logo what is termed "witness marks," These marks may be eliminated by machining the logo surfaces down to a sufficient depth on both the sonotrode and the anvil, so that no contact occurs with the work pieces fro either side, so no melting occurs in the region of the logo, and consequently no witness marks appear. Since no sealing of any significance occurs in the pouch in the region of the logo, the energy directors should generally extend at least 2-3 rum beyond the periphery of the logo, to produce a welded joining of the thin film work pieces having sufficient integrity to prevent leakage.

Figure 33:
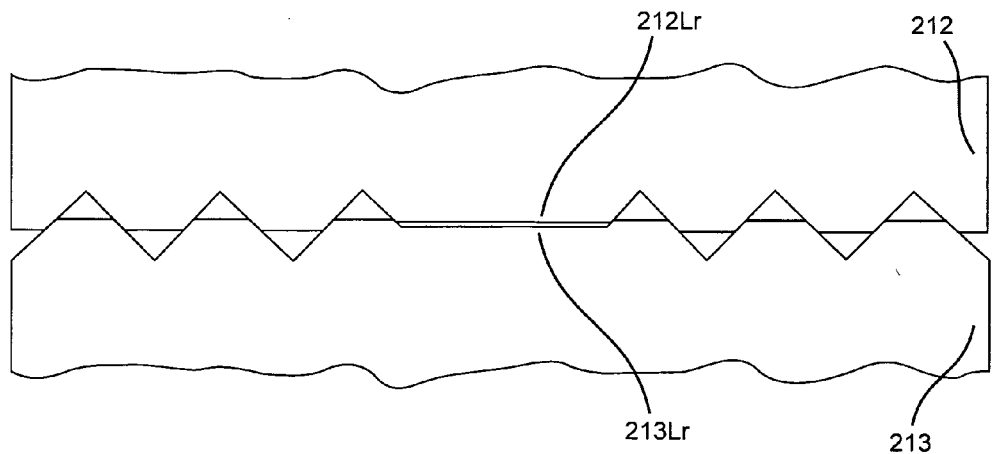
FIG. 33 is a section cut through the sonotrode of FIG. 32, showing the interlocking alignment of the energy director plateaus of the sonotrode with those of the corresponding anvil, and also showing a first embodiment of the logo surfaces of the present invention.
Figure 33A:
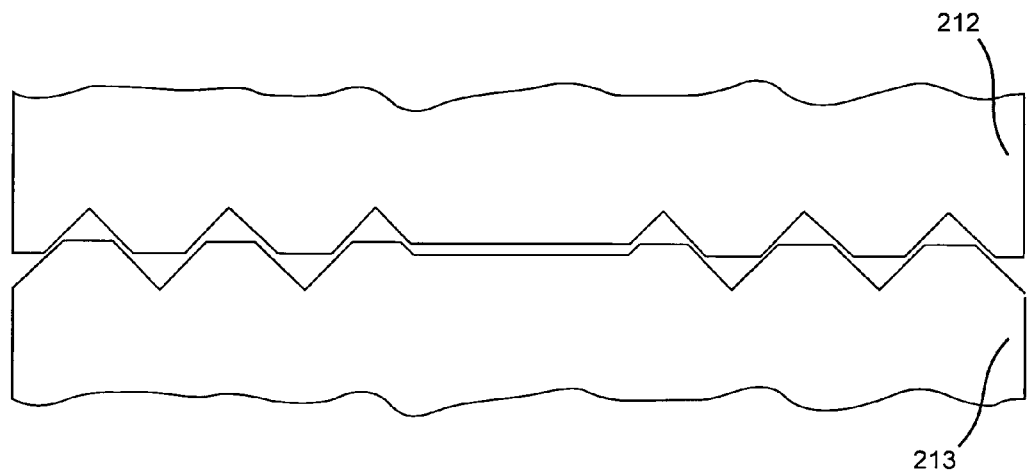
FIG. 33A is the section cut of FIG. 33, but shown with the sonotrode and anvil moved apart to represent separation that may occur during engagement upon a pair of work pieces.
Figure 34:
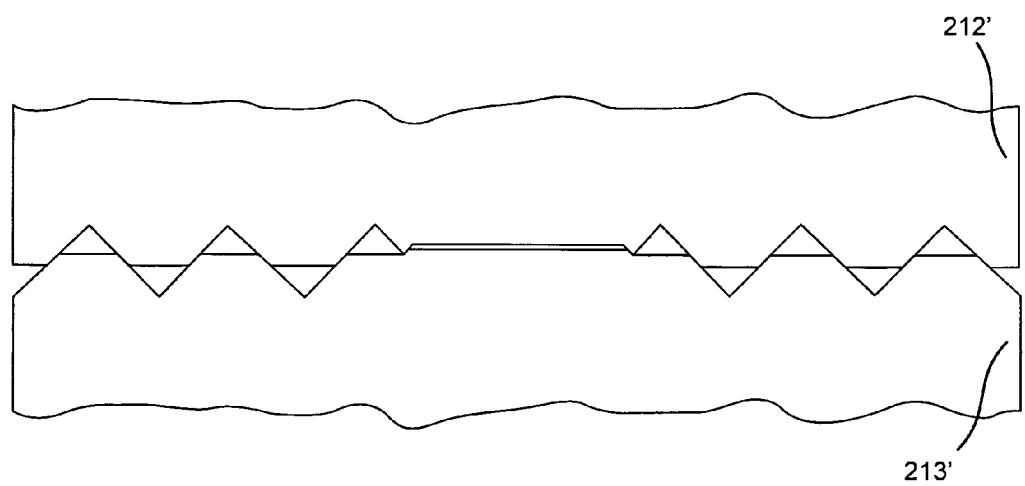
FIG. 34 is the section cut of FIG. 33, but showing a second embodiment of the logo surfaces of the present invention.

Another alternative approach includes deliberately sealing of the work pieces by the logo surfaces. The section cut taken through the letter "r" of that name "rinco" in FIG. 32, is used to illustrate the logo surface depth, and changes to the corresponding grids of energy directors, as seen in FIG. 33. Both the sonotrode 213 and the anvil 212 may have a corresponding logo surface-213Lr and 212Lr—that may be used to produce the letter "r," where each logo surface may transition into adjacent energy directors used to produce the more durable weld. In one embodiment of these sonotrode and anvil logo surfaces that produce sealing, they may be configured, as seen in FIG. 33, to be nominally positioned so that when the sonotrode and the anvil are in direct contact (no work pieces between them), they are positioned between both the plateau surfaces of the sonotrode and the plateau surfaces of the anvil. The distance between the flat logo surfaces of the sonotrode and the flat logo surfaces of the anvil, as seen in FIG. 33, may be such that when the sonotrode engages the anvil, they each make minimal contact with the thin film work pieces to cause melting and sealing that forms the "rinco" outline. This may result, when used in the welding process for the joining of two work pieces, in the logo "rinco" being inset within the peaks of the textured seal surface. In a second embodiment of this alternative approach, the logo surfaces of the sonotrode and the logo surfaces of the anvil may be configured, as seen in FIG. 34, to be nominally positioned so that when the sonotrode 213' and the anvil 212' are in direct contact, they are beyond both the plateau surfaces of the sonotrode and the plateau surfaces of the anvil. So when the sonotrode engages the anvil during the welding process, the logo surfaces on the sonotrode 213 minimally deform the work pieces and push them into contact with the logo surfaces of the horn 212, thereby causing melting and sealing to form the "rinco" outline. However, in this embodiment, it may result in the "rinco" logo being raised slightly above the peaks on one side of the textured seal surface that was formed by the energy directors.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

I claim:

1. An improved ultrasonic welding device, for use at a sealing station of a horizontal or rotary form-fill-seal machine or a pre-made pouch machine, said ultrasonic welding device comprising:

a housing;

a parallel gripper, said parallel gripper being fixedly secured to said housing;

a linear rail, a portion of said linear rail being fixedly secured to a portion of said housing;

an anvil support member, said anvil support member configured to slide relative to said linear rail, said anvil support member configured to be connected to a first piston of said parallel gripper;

a stack support member, said stack support member configured to slide relative to said linear rail, said stack support member configured to be connected to a second piston of said parallel gripper;

an anvil secured to said anvil support member;

an ultrasonic stack secured to said stack support member, said ultrasonic stack comprising a sonotrode; and wherein said first and second pistons of said parallel gripper are configured to cause translation of each of said anvil support member and said stack support member, relative to said housing, from a first respective position to a second respective position, said second respective position of said anvil support member and of said stack support member comprising a position where a surface of said anvil selectively engages a surface of said sonotrode.

2. The improved ultrasonic welding device according to claim 1 wherein said anvil being secured to said anvil support member comprises adjustably securing said anvil to said anvil support member.

3. The improved ultrasonic welding device according to claim 2 wherein said anvil being adjustably secured to said anvil support member comprises: a plurality of leveling feet threadably received in said anvil, and said anvil with said mounting feet being releasably secured to said anvil support member using holding screws at each location of said plurality of mounting feet.

4. The improved ultrasonic welding device according to claim 3 wherein said anvil support member being configured to slide relative to said linear rail is a sliding arrangement from the group of sliding arrangements consists of:

said anvil support member configured to slide upon said linear rail; and said anvil support member being fixedly secured to one or more bearing carriages, said one or more bearing carriages configured to slide upon said linear rail.

5. The improved ultrasonic welding device according to claim 4 wherein said stack support member being configured to slide relative to said linear rail is a sliding arrangement from the group of sliding arrangements consists of:

said stack support member configured to slide upon said linear rail; and said stack support member being fixedly secured to one or more bearing carriages, said one or more bearing carriages configured to slide upon said linear rail.

6. The improved ultrasonic welding device according to claim 5 wherein said ultrasonic stack being secured to said stack support member comprises a releasable securing arrangement comprising: a pair of clamp blocks secured to said stack support member using a fastening means.

7. The improved ultrasonic welding device according to claim 5 further comprising a cover configured to mate with said housing.

8. The improved ultrasonic welding device according to claim 7, wherein said surface of said anvil selectively engaging said surface of said sonotrode comprises:

said sonotrode comprising: a plurality of energy directors, said plurality of energy directors being spaced in a first direction and in a second direction to form a pattern, each of said plurality of energy directors comprising a rectangular-shaped plateau surface with each side of said rectangular-shaped plateau surfaces configured to transition into an angled side surface to create a first, a second, a third, and a fourth angled side surface for each said plateau surface; each of said angled side surfaces of each said plateau surface being connected with another side surface of an adjacent plateau surface, except at an outer periphery of said sonotrode;

said anvil comprising: a plurality of energy directors being spaced in a first direction and in a second direction to form a pattern, each of said plurality of energy directors comprising a rectangular-shaped plateau surface with each side of said rectangular-shaped plateau surfaces configured to transition into an angled side surface to create a first, a second, a third, and a fourth angled side surface for each said plateau surface; each of said angled side surfaces of each said plateau surface being connected with another side surface of an adjacent plateau surface, except at an outer periphery of said anvil; and wherein said energy directors of said sonotrode and said energy directors of said anvil are configured for alignment to ultrasonically weld thin work pieces, whereby said side surfaces of said sonotrode plateaus interlock with said side surfaces of said anvil plateaus in a pattern, in both said first direction and said second direction, to provide improved weld integrity permitting substantially narrower welds to reduce per-package material usage and costs.

9. The improved ultrasonic welding device according to claim 8 wherein said interlocking energy directors of said sonotrode and said anvil are configured to increase a total surface area of contact between said sonotrode and said anvil, and to thereby transmit vibrations to create frictional heat and cause minor elastic deformation of the thin work pieces to produce improved integrity in the packaging of solids and liquids.

10. The improved ultrasonic welding device according to claim 9 wherein said angled side surfaces for each said plateau surface is at an angle of 45 degrees to said plateau surface.

11. The improved ultrasonic welding device according to claim 10 wherein each of said angled side surfaces of each said plateau surface are connected with another side surface of said adjacent plateau surface to form a trough therebetween.

12. The improved ultrasonic welding device according to claim 11 wherein each of said angled side surfaces of each said plateau surface are connected with another side surface of said adjacent plateau surface with a radiused surface therebetween to for said trough.

13. The improved ultrasonic welding device according to claim 12 wherein each said rectangular-shaped plateau surfaces are oriented to have each said side be at a 45 degree angle to a weld-line.

14. The improved ultrasonic welding device according to claim 13, wherein said second direction on said sonotrode is orthogonal to said first direction on said sonotrode, with said plurality of energy directors of said sonotrode being regularly spaced in said first sonotrode direction and regularly spaced in said second sonotrode direction to form a grid pattern thereon; and wherein said second direction on said anvil is orthogonal to said first direction on said anvil, with said plurality of energy directors of said anvil being regularly spaced in said first anvil direction and regularly spaced in said second anvil direction to form a grid pattern thereon.

15. The improved ultrasonic welding device according to claim 14 wherein each said rectangular-shaped plateau surface is generally flat.

16. The improved ultrasonic welding device according to claim 15 further comprising a pedestal assembly configured to be secured to said housing, and configured to cause a height adjustment to said device.

17. The improved ultrasonic welding device according to claim 16 wherein said ultrasonic stack further comprises a booster and a converter.

18. An improved ultrasonic welding device comprising:
a housing;
a parallel gripper, said parallel gripper being fixedly secured to said housing;
a linear rail, a portion of said linear rail being fixedly secured to a portion of said housing;
an anvil support member, said anvil support member configured to slide relative to said linear rail, said anvil support member configured to be connected to a first piston of said parallel gripper;
a sonotrode support member, said sonotrode support member configured to slide relative to said linear rail, said sonotrode support member configured to be connected to a second piston of said parallel gripper;
an anvil secured to said anvil support member;
a sonotrode secured to said sonotrode support member; and
wherein said first and second pistons of said parallel gripper are configured to cause translation of each of said anvil support member and said sonotrode support member, relative to said housing, from a first respective position to a second respective position, said second respective position of said anvil support member and of said sonotrode support member comprising a position where a surface of said anvil selectively engages a surface of said sonotrode.

19. The improved ultrasonic welding device according to claim 18 wherein said anvil is adjustably secured to said anvil support member using: a plurality of leveling feet threadably received in said anvil, with said anvil and said mounting feet being releasably secured to said anvil support member using a holding screw through each of said mounting feet.

20. The improved ultrasonic welding device according to claim 18 wherein said anvil support member being configured to slide relative to said linear rail is a sliding arrangement from the group of sliding arrangements consists of:
said anvil support member configured to slide upon said linear rail; and
said anvil support member being fixedly secured to one or more bearing carriages, said one or more bearing carriages configured to slide upon said linear rail.

21. The improved ultrasonic welding device according to claim 18 wherein said stack support member being configured to slide relative to said linear rail is a sliding arrangement from the group of sliding arrangements consists of:
said stack support member configured to slide upon said linear rail; and
said stack support member being fixedly secured to one or more bearing carriages, said one or more bearing carriages configured to slide upon said linear rail.

22. The improved ultrasonic welding device according to claim 18 wherein said ultrasonic stack being secured to said stack support member comprises a releasable securing arrangement comprising: a pair of clamp blocks secured to said stack support member using a fastening means.

23. The improved ultrasonic welding device according to claim 18 further comprising a cover configured to mate with said housing.

24. The improved ultrasonic welding device according to claim 18 further comprising a pedestal assembly configured to be secured to said housing, and configured to cause height adjustment of said device.

25. The improved ultrasonic welding device according to claim 18 further comprising a booster and a converter.

26. The improved ultrasonic welding device according to claim 18, wherein said surface of said anvil selectively engaging said surface of said sonotrode comprises:
said sonotrode comprising: a plurality of energy directors, said plurality of energy directors being spaced in a first direction and in a second direction to form a pattern, each of said plurality of energy directors comprising a rectangular-shaped plateau surface with each side of said rectangular-shaped plateau surfaces configured to transition into an angled side surface to create a first, a second, a third, and a fourth angled side surface for each said plateau surface; each of said angled side surfaces of each said plateau surface being connected with another side surface of an adjacent plateau surface, except at an outer periphery of said sonotrode;
said anvil comprising: a plurality of energy directors being spaced in a first direction and in a second direction to form a pattern, each of said plurality of energy directors comprising a rectangular-shaped plateau surface with each side of said rectangular-shaped plateau surfaces configured to transition into an angled side surface to create a first, a second, a third, and a fourth angled side surface for each said plateau surface; each of said angled side surfaces of each said plateau surface being connected with another side surface of an adjacent plateau surface, except at an outer periphery of said anvil; and
wherein said energy directors of said sonotrode and said energy directors of said anvil are configured for alignment to ultrasonically weld thin work pieces, whereby said side surfaces of said sonotrode plateaus interlock with said side surfaces of said anvil plateaus in a pattern, in both said first direction and said second direction, to provide improved weld integrity permitting substantially narrower welds to reduce per-package material usage and costs.

27. A sonotrode and anvil combination, said sonotrode and anvil combination configured for use in ultrasonic welding of thin work pieces, for improved integrity in the packaging of solids and liquids with narrow welds to reduce per-package material usage and costs:
said sonotrode comprising:
a plurality of energy directors, said plurality of energy directors being generally spaced in a first direction and in a second direction to form a pattern, each of said plurality of energy directors comprising a rectangular-shaped plateau surface with each side of said rectangular-shaped plateau surfaces configured to transition into an angled side surface to create a first, a second, a third, and a fourth angled side surface for each said plateau surface; each of said angled side surfaces of each said plateau surface being connected with another side surface of an adjacent plateau surface, except at an outer periphery of said sonotrode, and except at one or more interior logo surfaces, at least a portion of said one or more interior logo surfaces configured to be generally flat and to be offset from said plateau surfaces;
said anvil comprising:

a plurality of energy directors being generally spaced in a first direction and in a second direction to form a pattern, each of said plurality of energy directors comprising a rectangular-shaped plateau surface with each side of said rectangular-shaped plateau surfaces configured to transition into an angled side surface to create a first, a second, a third, and a fourth angled side surface for each said plateau surface; each of said angled side surfaces of each said plateau surface being connected with another side surface of an adjacent plateau surface, except at an outer periphery of said anvil, and except at one or more interior logo surfaces, at least a portion of said one or more interior logo surfaces configured to be generally flat and to be offset from said plateau surfaces;

wherein said one or more logo surfaces of said sonotrode and said one or more logo surfaces of said anvil are configured for alignment to thereby ultrasonically weld a portion of the work pieces to produce a smooth seal surface to thereby spell out a company logo; and wherein said energy directors of said sonotrode and said energy directors of said anvil are configured for alignment to ultrasonically weld the thin work pieces, whereby said side surfaces of said sonotrode plateaus interlock with said side surfaces of said anvil plateaus in a pattern, in both said first direction and said second direction, to provide improved weld integrity permitting substantially narrower welds to reduce per-package material usage and costs.

28. The sonotrode and anvil combination according to claim 27 wherein said interlocking energy directors of said sonotrode and said anvil are configured to increase a total surface area of contact between said sonotrode and said anvil, and to transmit vibrations to create frictional heat and cause minor elastic deformation of the thin work pieces to produce a textured seal surface on the work pieces having improved integrity in the packaging of solids and liquids.

29. The sonotrode and anvil combination according to claim 27 wherein said one or more logo surfaces of said sonotrode and said one or more logo surfaces of said anvil are configured, during said engagement of said sonotrode with said anvil, to be nominally positioned to be between both said plateau surfaces of said sonotrode and said plateau surfaces of said anvil to thereby engage the work pieces.

30. The sonotrode and anvil combination according to claim 27 wherein said one or more logo surfaces of said sonotrode and said one or more logo surfaces of said anvil are configured, during said engagement of said sonotrode with said anvil, to be nominally positioned to be beyond both said plateau surfaces of said sonotrode and said plateau surfaces of said anvil to thereby engage the work pieces.

31. The sonotrode and anvil combination according to claim 27 wherein said one or more logo surfaces of said sonotrode and said one or more logo surfaces of said anvil are configured, during said engagement of said sonotrode with said anvil, to be nominally positioned to be beyond both said plateau surfaces of said sonotrode and said plateau surfaces of said anvil to thereby remain disengaged from the work pieces during said ultrasonic welding.

* * * * *